US012747827B2

(12) United States Patent
Rovekamp, Jr.

(10) Patent No.: US 12,747,827 B2
(45) Date of Patent: Sep. 29, 2026

(54) PLANAR NON-COMPRESSIBLE RIGIDIZABLE CHAIN ASSEMBLY

(71) Applicant: Roger Neil Rovekamp, Kemah, TX (US)

(72) Inventor: Roger Neil Rovekamp, Jr., Kemah, TX (US)

( * ) Notice: Subject to any disclaimer, the term of this patent is extended or adjusted under 35 U.S.C. 154(b) by 0 days.

(21) Appl. No.: 18/810,986

(22) Filed: Aug. 21, 2024

(65) Prior Publication Data

US 2025/0146617 A1 May 8, 2025

Related U.S. Application Data

(63) Continuation of application No. 18/340,050, filed on Jun. 23, 2023, now Pat. No. 12,078,291, which is a continuation of application No. 17/698,012, filed on Mar. 18, 2022, now Pat. No. 11,761,578, which is a continuation of application No. 16/902,326, filed on Jun. 16, 2020, now Pat. No. 11,313,512, which is a continuation of application No. 16/223,405, filed on Dec. 18, 2018, now Pat. No. 10,724,676, which is a continuation of application No. 15/397,208, filed on Jan. 3, 2017, now Pat. No. 10,161,562, which is a continuation of application No. 14/719,892, filed on May 22, 2015, now Pat. No. 9,557,005.

(60) Provisional application No. 62/002,586, filed on May 23, 2014.

(51) Int. Cl.

| | |
|---|---|
| ***F16M 11/00*** | (2006.01) |
| ***F16M 11/40*** | (2006.01) |
| ***F16M 13/02*** | (2006.01) |

(52) U.S. Cl.
CPC ............ *F16M 13/02* (2013.01); *F16M 11/40* (2013.01)

(58) Field of Classification Search
CPC ............................... F16M 13/02; F16M 11/40
See application file for complete search history.

(56) References Cited

U.S. PATENT DOCUMENTS

| | | | |
|---|---|---|---|
| 3,727,515 | A | 4/1973 | Nelson et al. |
| 5,891,068 | A | 4/1999 | Kenney |
| 5,895,880 | A | 4/1999 | Golden |
| 6,669,659 | B2 | 12/2003 | Dittmer et al. |
| 7,484,351 | B2 | 2/2009 | Harada et al. |
| 7,674,199 | B2 | 3/2010 | Golden et al. |
| 9,163,698 | B2 | 10/2015 | Kaihotsu et al. |
| 9,404,557 | B2 | 8/2016 | Kaihotsu et al. |
| 11,396,925 | B2 | 7/2022 | Wingfield et al. |
| 11,613,003 | B2 | 3/2023 | Graham et al. |
| 11,692,650 | B2 | 7/2023 | Graham et al. |
| 11,707,819 | B2 | 7/2023 | Graham |
| 11,752,622 | B2 | 9/2023 | Graham et al. |

(Continued)

*Primary Examiner* — Amy J. Sterling

(74) *Attorney, Agent, or Firm* — Woodard Emhardt Henry Reeves & Wagner LLP

(57) ABSTRACT

Disclosed are various examples of support assemblies comprising multiple elements engaged together and independently rotatable within or substantially parallel to a reference plane while resisting twisting, rotation, or other movement in directions other than substantially within or parallel to the reference plane. The elements typically include projecting members received within cavities of adjacent elements that are configured to allow the resulting assembly to collectively flex within, or substantially parallel to, the reference plane while resisting movement in other directions.

20 Claims, 16 Drawing Sheets

(56) References Cited

U.S. PATENT DOCUMENTS

| | | | |
|---|---|---|---|
| 2001/0025715 A1 | 10/2001 | Muller et al. | |
| 2006/0237291 A1 | 10/2006 | Ozaki et al. | |
| 2008/0017397 A1 | 1/2008 | Komiya et al. | |
| 2009/0025360 A1 | 1/2009 | Schneider | |
| 2011/0192133 A1 | 8/2011 | Veltrop et al. | |
| 2021/0285374 A1* | 9/2021 | Hawke | F01D 21/003 |

* cited by examiner

PLANAR NON-COMPRESSIBLE RIGIDIZABLE CHAIN ASSEMBLY

CROSS-REFERENCE TO RELATED APPLICATION

This application is a Continuation of application Ser. No. 18/340,050 filed Jun. 23, 2023, which is a Continuation of application Ser. No. 17/698,012 filed Mar. 18, 2022, which is a Continuation of application Ser. No. 16/902,326 filed Jun. 16, 2020, which is a Continuation of Application of Ser. No. 16/223,405 filed Dec. 18, 2018, which is a Continuation of application Ser. No. 15/397,208 filed Jan. 3, 2017, which is a Continuation of application Ser. No. 14/719,892, filed May 22, 2015, which claims the benefit of U.S. Provisional Application No. 62/002,586 filed May 23, 2014, which are hereby incorporated by reference.

BACKGROUND

The present disclosure relates generally to chain assemblies with aspects of the disclosure related more specifically to chain assemblies with links configured to move along a particular plane of support or plane of motion while reducing or eliminating movement in other directions outside of or away from the plane of support.

Chain assemblies can be useful for towing, raising, or otherwise exerting tension on an object. Such devices usually rely on multiple individual "links" or coupling elements interconnected together to transmit external tension or "pulling" forces through or along the length of the chain between two objects connected to opposite ends of the chain. Such an arrangement may be advantageous in many circumstances such as when pulling or lifting a load but are likely problematic if the goal is to push the load or keep the load from twisting or deflecting out of a particular alignment with the chain. This is because chain assemblies often have no provision for transmitting external compression forces applied between two objects at opposite ends of the chain. Similarly, chain links are often not configured to avoid lateral deflection of one link in relation to another. Thus chain assemblies are commonly only useful in transmitting tension between objects, not for limiting compression, torque, or other forces that may be applied to objects supported by the chain.

Additionally many chain assemblies consist of elements which have a very limited ability to control the movement of one element with relation to another. In many applications where the chain is used to apply tension, such a feature may not be necessary or desirable. Such a chain assembly may collapse under compression forces or may not be able to resist forces applied from other directions thus limiting its usefulness to applying tension. Thus chain assemblies are often incapable of delivering or withstanding external compression forces or providing structural support to withstand forces applied from other directions.

SUMMARY

Disclosed are examples of chain assemblies with rotatable support elements arranged linearly such that the support elements extend longitudinally within a reference plane and are substantially prevented from moving or rotating out of the plane. Such assemblies operate as support assemblies limiting motion within or substantially parallel to the plane. This limited motion may be achieved by virtue of the arrangement and positioning of a projecting member extending outwardly from the support elements being received within a receiving cavity of an adjacent support element. This configuration of projecting members and receiving cavities can be configured so that the projecting member is receivable and moveable within the receiving cavity and can rotate around an axis of rotation substantially perpendicular to the longitudinal axis and the reference plane, but not in a direction other than within or parallel to the reference plane. A retention system can be included that is arranged and configured to retain the projecting member of the first element within the cavity of the second element when the retention system can be actuated to prevent disengagement of the elements, or to control the direction and extent of their collective bending or displacement.

Additional examples also disclose various combinations of supporting elements and retention devices in the form of frames, braces, and similar structures useful to support loads. Examples include these or other structures that are configured to move only within or parallel to a plane but not in other directions.

The various examples of support assemblies disclosed herein may be used in a variety of different applications, including industrial applications, commercial applications, personal applications, and/or wearable applications Further forms, objects, features, aspects, benefits, advantages, and examples will become apparent from a detailed description and drawings provided herewith.

DETAILED DESCRIPTION

Figure 1:
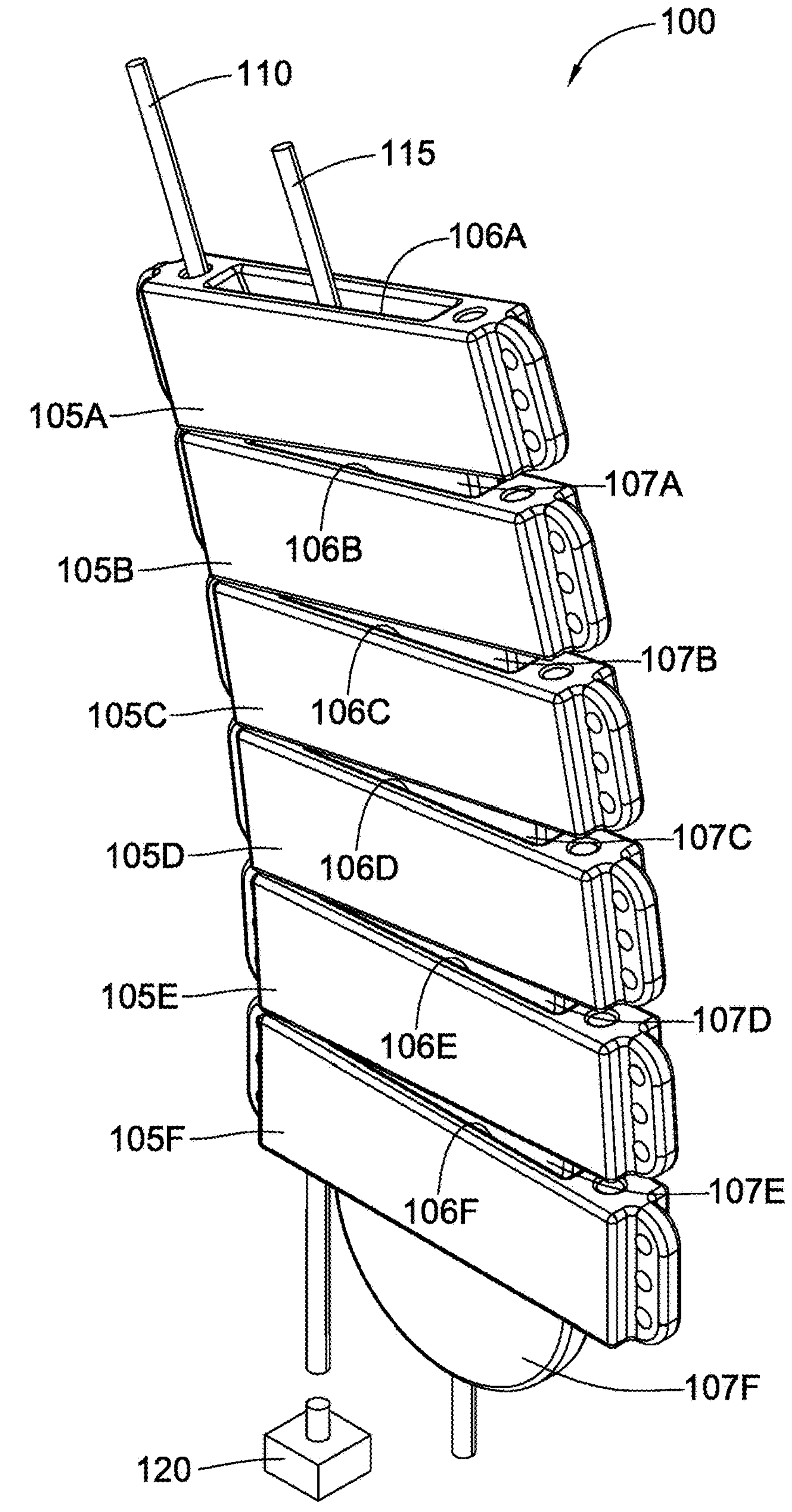
FIG. 1 is a perspective view of a portion of a support assembly.

For the purpose of promoting an understanding of the principles of the invention, reference will now be made to the examples illustrated in the drawings and specific language will be used to describe the same. It will nevertheless be understood that no limitation of the scope of the invention is thereby intended. Any alterations and further modifications in the described examples, and any further applications of the principles of the invention as described herein are contemplated as would normally occur to one skilled in the art to which the invention relates. One or more examples of the invention is shown in great detail, although it will be apparent to those skilled in the relevant art that some features that are not relevant to the present disclosure may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof. Multiple related items illustrated in the drawings with the same part number which are differentiated by a letter for separate individual instances may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "lateral support elements 90," or by a distinguishable portion of the full name such as "elements 90".

Disclosed herein are various examples of a support assembly comprising various support elements in a linear arrangement similar to a chain with links extending longitudinally in a row. The elements can be arranged longitudinally in this manner within or at least parallel to a supporting plane. The supporting plane in that sense can be thought of as an imaginary reference plane passing through the elements of the assembly, or passing parallel to them. This plane may be referred to as the "supporting plane" or "plane of support" to aid in understanding the disclosed examples. The support elements may be configured to reduce or eliminate deflection that may be caused by forces applied to the elements in directions not parallel to the plane of support. The supporting elements can be configured to freely or selectively flex in directions that are fully within or substantially parallel to the plane of support. Thus the support assembly can bend or flex along the plane of support while providing varying degrees of support against flexing or bending in other directions.

This behavior can be achieved by various arrangements of supporting elements that each may include a tongue, tab, or other projecting member extending outwardly away from the supporting element that is configured to be received by a corresponding slot, indention, or cavity defined by adjacent supporting elements. This "tab" and "slot" arrangement may be configured such that the tabs and corresponding slots have a semi-circular or rounded shape allowing the tab to rotate or pivot within the receiving cavity. Such an arrangement can allow one supporting element in the assembly to rotate around one axis of rotation while adjacent elements may also rotate around separate axes of rotation. Thus each supporting element may independently pivot with respect to adjacent elements allowing the full assembly of elements to collectively bend or flex along the plane of support. Put another way, the supporting elements in this configuration can collectively control movement of the elements constraining them to rotate or swing substantially parallel to the plane of support while resisting rotation or movement in other directions not substantially parallel to the plane of support.

The projecting member and corresponding receiving cavity may be of any suitable shape to achieve the desired effect. For example, the interior of the receiving cavity may include parallel planar sides with a circular or semi-circular bottom surface. The sides and bottom may be thought of as force bearing surfaces where the sides of the cavity support the inserted projecting member maintaining it within or substantially parallel to the plane of support as the projecting tab pivots within the cavity. The bottom surface may also provide support, for example, if a compressing force is applied longitudinally to the array of supporting elements parallel to the plane of support thus urging the elements together. Any suitable cavity and/or projecting member with shapes configured to achieve satisfactory results similar to those disclosed herein are envisioned.

One supporting element in the chain may pivot with respect to neighboring elements until physically constrained. The extent of this pivotal motion may, for example, be limited by the shape of the supporting elements. One element may rotate until it directly contacts an adjacent element forcing it to stop pivoting further. For example, each supporting element may be configured to rotate no more than 10 degrees with respect to adjacent elements. If five elements are used in the assembly, the full assembly might be able to achieve a maximum overall deflection of 50 degrees.

This overall deflection can be modified, by varying the points of contact along the corresponding surfaces of the supporting elements. The surfaces may be shaped in various ways to allow more rotation in one direction than another. For example, the supporting elements may be constructed to allow the assembly to straighten longitudinally, flex in one direction within or along the plane of support, but not in the opposite direction. Similarly, the supporting elements may be constructed to provide greater flexibility in one direction parallel to the plane of support, and less in any other direction. In this way, the support assembly may provide not only support against movement normal to the plane of support, but support against movement beyond a particular maximum deflection of the support assembly as a whole parallel to the plane of support as well.

This support assembly may include lines passing through the support elements in the assembly serving various purposes. These lines may be any combination of cables, tubes, wires, or retention devices for keeping the assembly engaged together. For example, each support element may define various passageways that collectively can align to create passageways running longitudinally through the support assembly. Such openings running through the assembly allow a line to be positioned within the assembly and configured to apply a tension force to the supporting elements so that the projecting members are retained within the receiving cavities. This application of tension may allow compression forces to then be transmitted longitudinally along or through the assembly. In other words, by "pulling" the individual elements together under internal tension, the assembly as a whole may be used to "push" objects or otherwise apply compression forces externally to other objects.

Lines operating in this fashion may be retention lines operating as part of a retention system. Examples of such a line or lines include any suitable biasing element such as an elastic band made of rubber, a spring, or an elastic chord to name a few non-limiting examples. The lines may also include cables coupled to actuating devices configured to be selectively tightened or shortened in length causing the supporting assembly to perhaps flex or bend in one direction versus another along the plane of support. Similarly, the retention system may collect data from the actuating devices or other sensors regarding position of individual elements in the assembly. The retention system may also measure the extent of overall deflection by measuring the position or length of one of the retention lines as the actuating devices are activated to adjust the position and arrangement of the support elements in the assembly.

The support elements can take any form, as well. Besides being linked together in a selectively rigid chain, support elements can include other structures with projecting tabs and receiving slots at different locations along the structure such as at opposing ends. For example, a connecting segment with coupling tabs and receiving cavities at opposite ends can be configured as discussed herein such that the projecting members at each end of one connecting segment are received within corresponding cavities at the ends of adjacent connecting segments. The connecting segments may also define a shape such as an arch. This arrangement may be characterized as two support assemblies combined operating together, or as one support assembly with additional features providing additional rigidity. Both sets of tabs and cavities on each end of the connecting segments can be thought of as having the same plane of support, or two separate planes of support that are substantially parallel. In either case, the combination can be additionally resistant to bending or flexing in a direction that is not substantially parallel to the supporting plane or planes.

Support elements in the assembly may be configured in other ways as well. For example, bracing members, arms, plates, and the like may include the projecting members and cavities as well as similar passageways discussed herein to provide different types of supporting structures such as selectively flexible supporting frames or other structures.

One example of a support assembly is illustrated at 100 in FIG. 1. As illustrated in FIG. 1, support elements 105A-105F can be organized linearly in a chain or stacked arrangement with individual elements 105 positioned adjacent one another and engaged together to collectively flex or bend fully within or substantially parallel to a reference plane while resisting twisting, flexing or bending in other directions. As noted herein elsewhere, support elements 105 can be arranged so that a portion of one supporting element can be fit within or are received within cavities or slots defined by an adjacent element or elements. For example, projecting members 107A-E may extend outwardly away from corresponding elements 105 and may be received within receiving cavities 106A-F of other adjacent support elements.

Projecting members 107 can be retained within cavities 106 by a retention system that may optionally include a first line 110 and a second line 115. These lines may pass through the support assembly as illustrated in FIG. 1 and may operate as retention members providing tension forces on elements 105 for maintaining the support elements in engagement with one another. In other words, the assemblies disclosed herein may be "rigidized" by applying tension through and/or between the multiple elements (like elements 105) causing them to engage and collectively stiffen. These tension or "rigidizing" forces may allow external forces exerted against the assembly pushing or compressing elements 105 toward one another to be transmitted longitudinally along or through the assembly. In other words, it may be possible to transmit external compression forces applied to the assembly outward away from the assembly and into another object by applying tension inwardly on the individual elements to retain the elements in contact with one another. In another aspect, controlling the tension applied may be accomplished by an actuator or actuating system 120. Actuating system 120 may be configured to control the tension of the first and/or second lines, may be part of the support assembly to control the overall flexibility, the direction in which assembly 100 flexes along the supporting plane, and the extent to which it may collectively bend.

The shape of the receiving cavities 106 and projecting members 107A-F may dictate how the overall support assembly 100 can flex or bend, or how resistant to such flexing or bending it may be as well. Supporting elements 105 can generally rotate or pivot around an axis of rotation defined by the shape of cavities 106 and projecting members 107. In the example of FIG. 1, projecting members 107 appears as a partial disc being semi-circular or ovular with parallel substantially planar front and back sides and a curved or rounded surface extending away from the rest of supporting element 105. The supporting plane for assembly 100 can be thus defined by the arrangement of substantially planar sides of projecting members 107 corresponding to substantially planar interior surfaces of cavities 106.

When, for example, projecting member 107A is inserted into receiving cavity 106B as illustrated in FIG. 1, supporting element 105A can pivot relative to supporting element 105B in, or parallel to, a plane of support that is substantially parallel to the sides of projecting member 107A and the interior surfaces of cavity 106B. Factors affecting twisting, bending, or other movement in other directions include the positioning of the projecting member within in the receiving cavity, the shape of the projecting member and the cavity, the fit between projecting member or tab and receiving cavity or slot, as well as the rigidity of the materials used in constructing the projecting members 107 and the receiving cavity 106, to name a few. Thus elements 105A-F pivot separately relative to one another by virtue of the projecting tongue portion being received by the cavity slot as shown in FIG. 1, which allows the resulting assembly to collectively bend or flex in a direction parallel to the plane of support while being substantially prevented from flexing, bending, or rotating out of a substantially parallel relationship with this first plane by virtue of the positioning of the projecting member within the receiving cavity.

Figure 2:
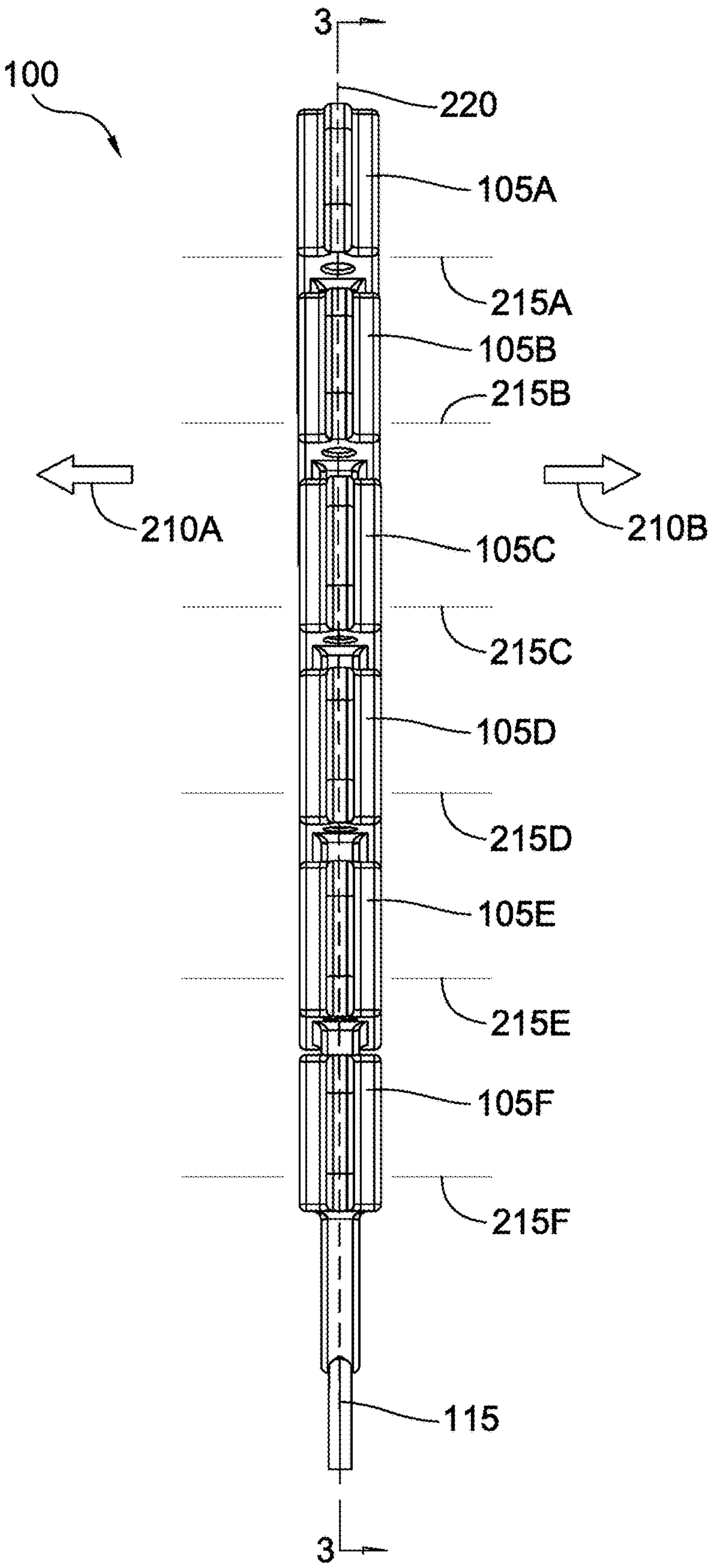
FIG. 2 is a side view of the support assembly of FIG. 1.

Supporting elements 105A-F illustrated in FIG. 1 are further illustrated in FIG. 2 as support assembly 100. Elements 105A-F are each illustrated with a separate and independent axis of rotation 215A-F which can be substantially perpendicular or normal to a supporting plane 3 denoted by section lines 3. Supporting elements 105A-F are linearly arranged along a longitudinal axis 220 within or substantially parallel to the supporting plane 3.

As discussed above, support assembly 100 may be substantially inflexible in a direction other than fully within or substantially parallel to a supporting plane, such as plane 3, by virtue of the shape of projecting members and receiving cavities, as well as the materials used in support elements 105. For example, support assembly 100 may be substantially inflexible, that is to say substantially rigid, in the directions indicated by arrows 210. Support assembly 100 in this configuration may provide for flexing according to the combined pivotal movement of support elements 105A-F rotatable about several separate axes of rotation 215A-F. Thus flexibility along one plane that is substantially perpendicular to the axes of rotation 215A-F may be achieved while support assembly 100 remains substantially inflexible and capable of operating as a support or load bearing structure configured to resist forces applied in substantially other directions not substantially parallel to the plane of support.

Figure 3A:
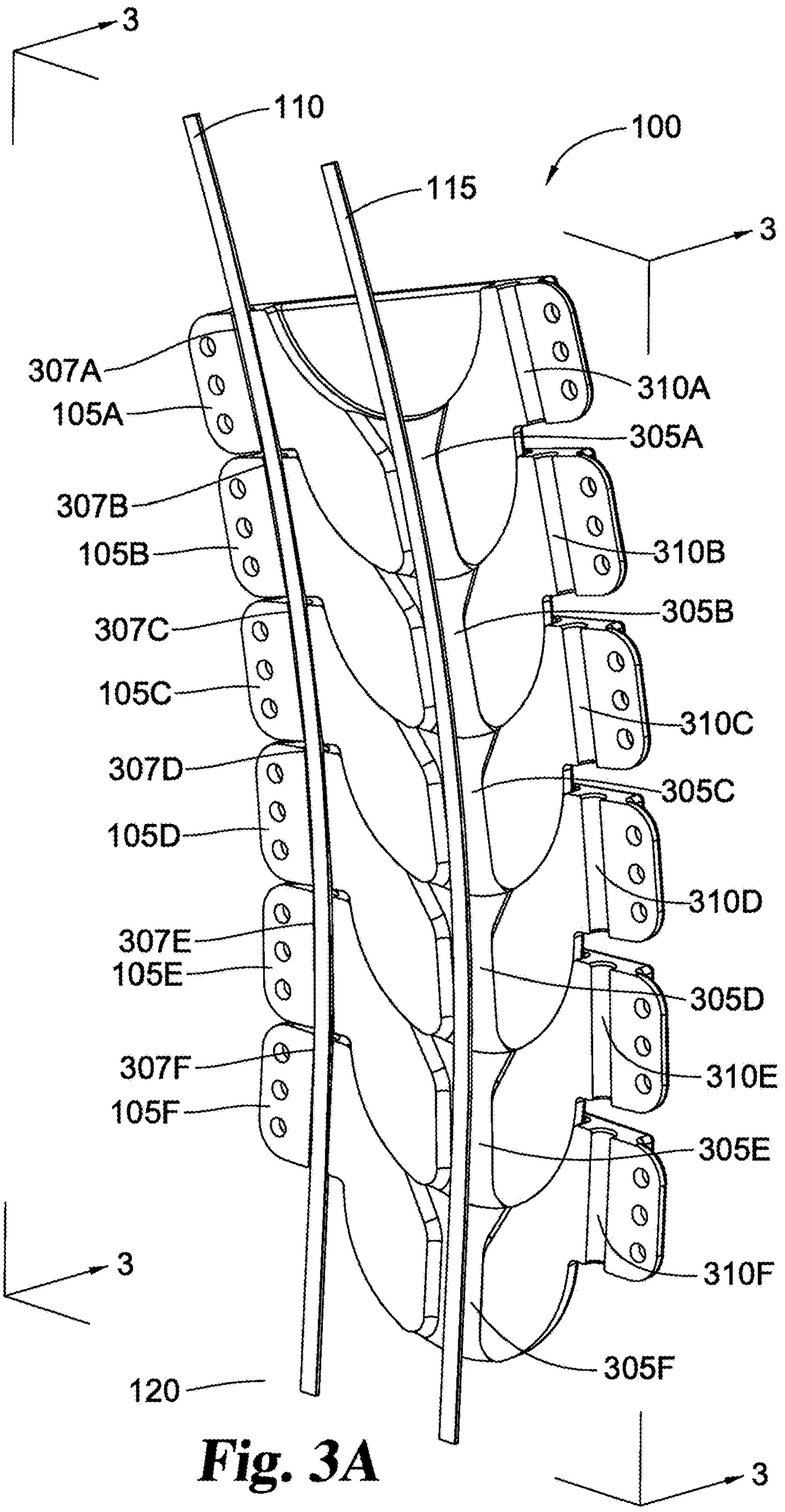
FIG. 3A is a cross-sectional view of the support assembly of FIG. 1.

FIG. 3A illustrates a cutaway view of support assembly 100 cut along section lines 3 and viewed facing in the direction indicated by the arrows accompanying section lines 3 in FIGS. 2 and 3. In one example, supporting elements 105A-F collectively define passageways 307, 305, and 310 through support assembly 100. First passageway 305 is defined by separate passageways 305A-F passing through the corresponding projecting members 107A-F extending outwardly from support elements 105A-F. Additional optimal passageways laterally displaced from passageways 305A-F are shown as 307A-F and 310 A-F.

Any combination of these passageways may be used for various purposes including maintaining supporting elements 105 engaged together adjacent one another. A retention system that includes elongate members or lines 110 and 115 operating as retention members configured to maintain projecting members 107 within cavities 106 may be positioned within these passageways. In one example, elongate member 115 may be a line such as an elastic band, spring, or other biasing member operating alone or as part of a retention system for retaining supporting elements 105A-F adjacent one another as illustrated. Line 110 may be coupled to an actuator 120 that can, for example, increase or decrease the tension on line 110 retaining members 107 within cavities 106. Tension on line 110 may thus allow support elements 105 to pivot individually with respect to one another while maintaining the ability to flex within or substantially parallel to the plane of support but not in other directions. As the elements pivot, support assembly 100 can flex within or substantially parallel to the plane of support according to the tension applied by actuator 120. In other words, by applying tension to line 110, support assembly may collectively rotate substantially parallel to the plane of support with minimal rotation or flexing in directions not substantially parallel to the plane of support. Counter tension pulling against actuator 120 may be applied by line 110 itself, or by other retention members. For example, line 110 may be a biasing member such as an elastic chord or spring applying tension that may be increased or decreased by actuating the actuator 120. Actuator 120 may also be configured with measuring devices to measure the rate, or extent of the flexing of assembly 100 by, for example, measuring changes in the length, position of the line 110, or tension on line 110. Examples of measuring devices that may be used devices include string potentiometers, string encoders, cable position transducers, and the like.

These passageways may be used for various purposes as illustrated, for example, for additional lines 110, or left empty for other uses. Line 110 may also be a single cable, or bundle of cables, or wires, which may be used in support assembly 100 for other purposes besides retaining supporting elements 105 in the linear arrangement as illustrated. Other configurations of lines 110 and 115 are envisioned as well where line 110 is positioned within passageway 307 and line 115 is positioned within passageway 310. Similarly, actuator 120 may be coupled to line 115 instead of 110, or to both. Any suitable combination of passageways and lines or other elongate members (or lack thereof) may be used in the passageways running through support assembly 100.

Figure 3B:
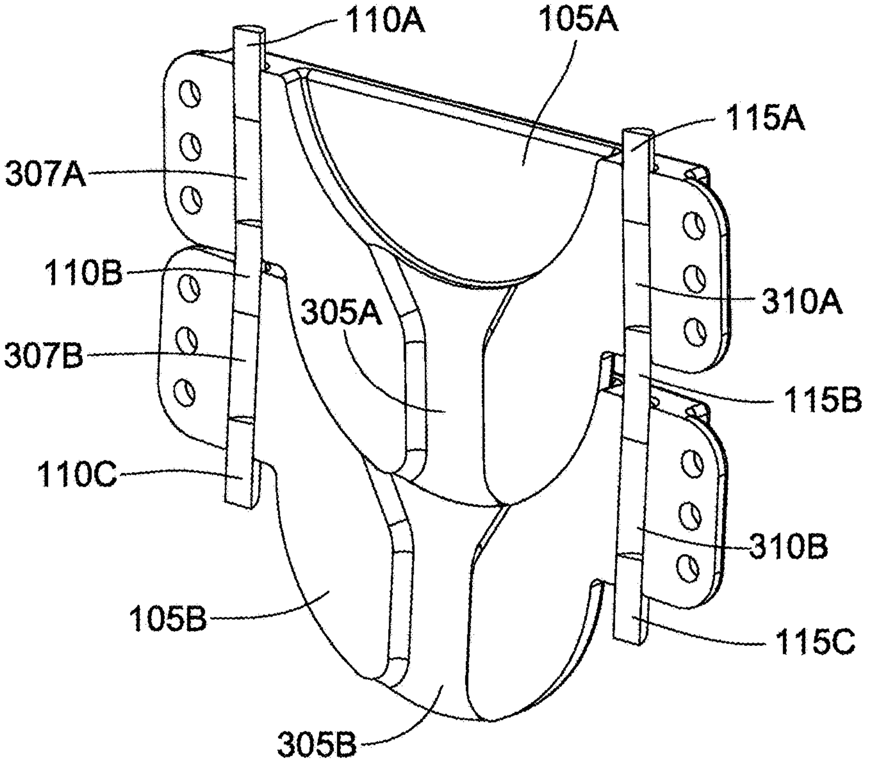
FIG. 3B is another cross-sectional view of the support assembly of FIG. 1 with alternative features illustrated.
Figure 3C:
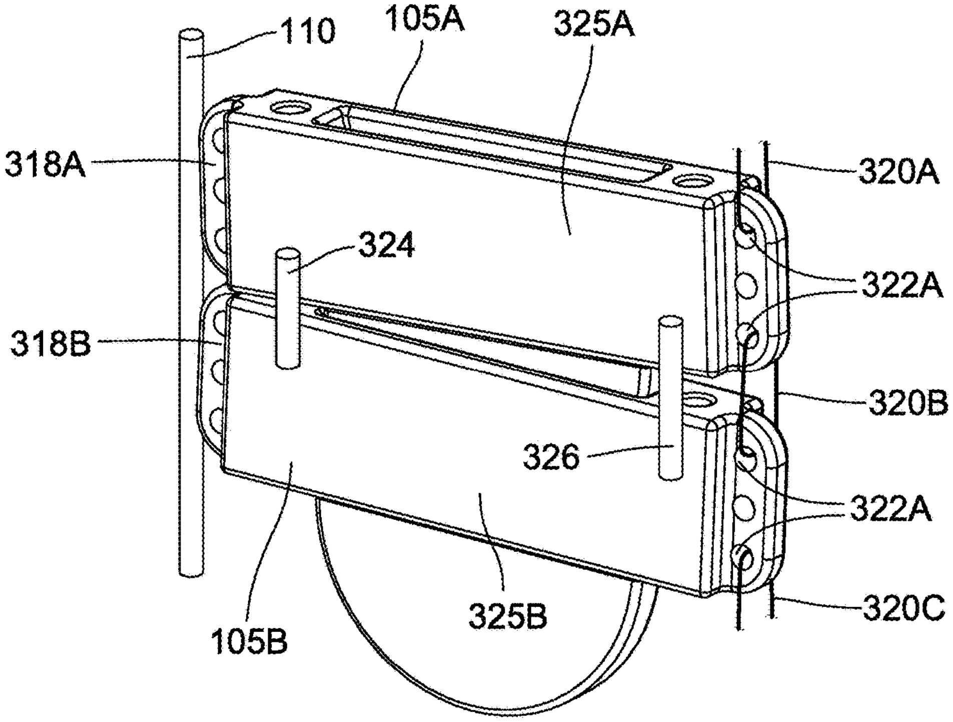
FIG. 3C is a partial perspective view of the support assembly of FIG. 1 with alternative features illustrated.

Another configuration for retaining elements 105 engaged to maintain elements 105 together is illustrated in FIGS. 3B and 3C. In FIG. 3B, lines 110A-C are positioned within passageway 307, but each is a separate and independent retaining member individually coupling a support element (105A) with an adjacent support element (105B) without extending further to other support elements, or without extending the length of the assembly. Retention members 110A-C in this configuration might be individual biasing elements such as springs, elastic bands, rubber bands, and the like fixed in position in passageway 307 to provide retention forces to support elements 105. A similar configuration appears as well in the example shown for lines 115A-C which are configured similarly in passageway 310A. These individual retention members retaining individual elements 105 together may be used as shown, or in conjunction with other retention elements described and illustrated herein. For example, a single retention member 110 might be used in conjunction with individual retention members 115 and vice versa.

Other examples of other retention mechanisms and configurations appear in FIG. 3C where line 110 again appears as a retention member like those discussed herein, but is configured outside any passageway defined by support elements 105. In this example, retention member 110 is coupled, fixed, or joined to one or more of the support elements 105 in the assembly on an exterior surface such as an end surface 318A and 318B. Any suitable coupling device may be used to maintain line 110 in place such as any suitable adhesive or fastener.

Also shown in FIG. 3C are retention members 320A-C which appear as another example of an external retention member outside any passageways defined by and/or passing through supporting elements 105. Retention members 320 individually retain supporting elements 105 together by engaging outside features such as mounting holes 322A and 322B defined by elements 105. In other words, elements 105 may define internal passageways for one or more retention members or lines that are configured to pass transverse to or substantially perpendicular to the plane of support. Retention members 322 as illustrated represent any suitable device like those discussed herein such as elastic bands, springs, or other suitable biasing devices that are coupled to mounting holes or other exterior features of support elements 105 and operate to retain adjacent elements together.

Another example of retention members is illustrated in FIG. 3C where retention members 324 and 326 are coupled to outside surfaces 325A and 325B. Retention members 324 and 326 may be constructed and configured like retention member 110, 320, or any other retention member or device discussed herein. Members 324 and 326 may be springs, elastic bands, or any other suitable device for keeping elements 105 engaged together as disclosed. Any of the retention members discussed herein such as lines 110, or members 320, 324, and 326 may also be unbiased devices such as metal cables, string, polymeric strands or chords, and the like. Such retention members as these may be substantially inflexible and configured to retain elements 105 and other similarly disclosed elements in substantially one position relative to other elements. For example, member 324 may be inflexible or unbiased, while member 326 may be biased. In this configuration, elements 105 may rotate in one direction toward element 324 and within or substantially parallel to the plane of support while not rotating in another direction toward element 326. Such an arrangement may be configured using multiple biased and unbiased retention members in any suitable configuration in any of the examples disclosed or envisioned herein.

Figure 4A:
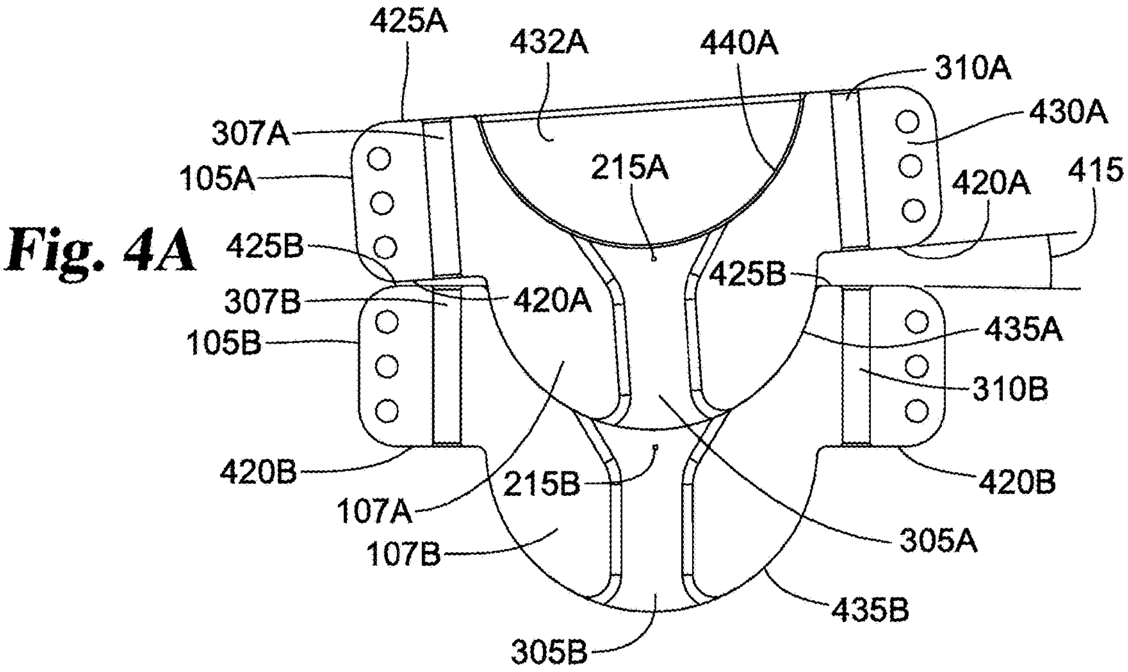
FIG. 4A is another cross-sectional view of the support assembly of FIG. 1.
Figure 4B:
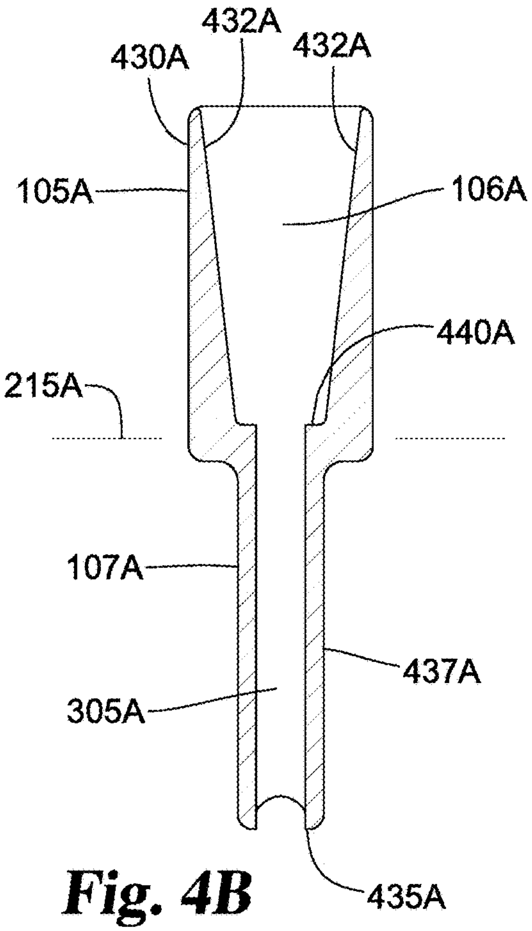
FIG. 4B is a partial cross-sectional view of the support assembly of FIG. 1.

Additional detail support assembly 100 is illustrated in FIGS. 4A and 4B where supporting elements 105A and 105B are configured as discussed above. FIG. 4B illustrates a cross sectional view of one element 105A from supporting assembly 100 providing additional detail common to other elements 105B-F as well. In FIGS. 4A and 4B, supporting elements 105 include a body 430 that defines a cavity 106 with walls 432 terminating at surface 440. The walls 432 of cavity 106 may be substantially planar as illustrated, and substantially parallel to the support plane 3. In this configuration, walls 432 and surface 440 may be configured to provide support and may operate as load bearing surfaces adjacent to or in contact with corresponding outer surfaces 437 of projecting member 107 when projecting member 107 is engaged within cavity 106. The sides of member 107 may be retained between walls 432 and the furthest extent 435 of projecting member 107 may provide for additional support as well as rotational movement.

As illustrated, corresponding surfaces 435 of projecting member 107 and surface 440 of cavity 106 may be circular, semicircular, and the like as illustrated for providing pivotal movement of projecting member 107 within receiving cavity 106 around axis of rotation 215. Motion of supporting elements 105 provides for an angle of rotation 415 of two supporting elements 105 relative to each other. Pivotal motion of these sporting elements relative to one another may be limited by contact between a second surface 425B of element 105B and a first surface 420A of supporting element 105A. As supporting elements 105 rotate relative to one another, their shape may restrict the maximum pivotal movement of one element with respect to an adjacent element. As illustrated further below, various modifications to the surfaces and resulting shape of the supporting elements may be made to provide for additional rotational motion of each element with respect to adjacent elements thus affecting overall flexibility.

As noted here, and as can be seen in FIGS. 1 and 2, sides 432 of cavity 106 may be configured as primary supporting structures providing support against forces in directions not within or substantially parallel to the plane of support. Such forces may be directed to move or rotate supporting elements 105 transverse to the supporting plane 3 thus attempting to “bend” or “flex” the supporting elements individually, and the assembly as a whole, in directions not substantially parallel to the plane of support. In using substantially planar or “flat” sides for cavity 106, displacement of elements 105 by torque or twisting forces exerted circumferentially around, or transverse to, the longitudinal axis 220 of the combined support assembly can be minimized or eliminated.

Some additional movement in a direction other than within or substantially parallel to the support plane may be provided for. For example, the space between the outer surfaces 437 of projecting member 107 and the walls 432 of cavity 106 may be increased creating the opportunity for additional movement of each element with respect to adjacent elements in a direction not substantially parallel to the supporting plane. An example of how this might be done appears in FIG. 4C where elements 455A and 455B are configured and engaged together in a manner similar to elements 105A and 105B as discussed above and shown in the preceding figures. Projecting member 470 extends into a cavity 456 defined by walls 450. In this example, walls 450 angle outwardly from the center of cavity 456 such that additional space within cavity 456 is available between projecting member 470 and walls 450. This additional space provides for rotation of one supporting element with respect to another that is not substantially parallel to the support plane as described previously. This configuration allows support elements 455 to rotate out of alignment up defining a rotation angle 460 providing a maximum displacement shown at 465 in either direction away from the longitudinal axis 475 of the assembly. Therefore such additional spacing may or may not be advantageous depending whether and to what extent rotation in other directions away from the plane of rotation is desirable.

The displacement 465 may also be achieved by varying the type of material used to construct support elements 105. For example, in the case where support elements are formed as a unitary molded structure using a single material, the support element 105 and others like it disclosed herein may be constructed of substantially rigid materials such as metal, wood, rigid polymeric materials, and the like. Where rigid materials are used, and the space within cavity 456 between projecting member 470 and walls 450 is small, support elements 455 can rotate within or parallel to a plane like plane 3 with little deviation in other directions away from the plane 3. Using rigid materials may also provide the ability for external compression forces pushing elements together to be applied longitudinally along or through support elements 105. In another example, support elements 455, and others like it disclosed herein may be constructed of multiple materials that may be less rigid. Projecting members like projecting member 475 or 107 may be constructed of a softer material such as a flexible polymeric material or rubber that can maintain its shape but provides additional flexibility normal to the support plane. The body portion of the support element defining cavity 106 or 456 may be constructed of a material that is different from the more flexible material used in projecting member 107 that may be substantially inflexible such as metal, wood, or a rigid polymeric material. In this way, the extent to which support structures disclosed herein can deviate from the supporting plane may be controlled by the space between the cavity walls and the outer surfaces of the projecting member, by the flexibility of the materials used in molding or assembling the support elements, or by any suitable combination thereof.

It may also be advantageous to vary the construction and materials used for various elements within a particular support assembly as well with elements in one portion of the assembly allowing for greater freedom of movement in directions other than parallel to the plane of support than the elements in another portion of the assembly. Besides increased freedom of movement, the materials and material properties in the supporting elements may be varied according to various advantageous of the materials. Some materials may be used to form parts of supporting elements 105, 465, and others like them disclosed herein because these materials are stiffer, stronger, more easily obtained, more resistant to friction caused by movement relative to other elements or parts of elements, and the like. Other materials may be used as well which may not be particularly rigid, but may be used to line load bearing surfaces like 450, 470, 475, 440, 435, and others like them disclosed herein so as to reduce the negative effects of frictional forces. Therefore, it should not be assumed from the figures and description that supporting elements in a support assembly are each a single piece constructed of only one material.

Additional support for an assembly like the one shown in FIGS. 1-4C may be achieved by combining multiple projecting members in a single supporting element having multiple receiving cavities. One example of this kind of support assembly is illustrated in FIG. 4D where supporting elements 480 having multiple projecting members 487 and 488 extending outwardly away from the supporting elements and received within multiple corresponding receiving cavities 490 and 492 respectively. Such a configuration allows the supporting elements 480 to pivot or rotate with axes of rotation like those shown in FIG. 2 with a range of motion similar to what is shown in FIG. 4A with respect to angle 415. The double column configuration of projecting members and receiving cavities has the advantage of providing additional support parallel to the supporting plane making the structure stronger and more resistant to bending, flexing, twisting, or otherwise moving in a direction other than substantially parallel to the supporting plane. Similar materials and principles of construction might be used in assembly 490 as are discussed herein elsewhere that may vary the flexibility or rigidity depending on the application.

Various passageways may be included as well in assembly 490 such as passageways 482, 483, 484, and 485 defined by the supporting elements 480 which may, for example, be used for retention members as discussed herein. Also, a central passageway 481 may also be defined by supporting elements 480 configured to pass through the support assembly. In the case where passageways 482-485 are used for retention members such as retention members like 110 and 115, passageway 481 may be used for protecting and retaining other lines such as tubes, wires, cables, and the like which may serve other purposes related or unrelated to the performance of assembly 490.

Figure 4C:
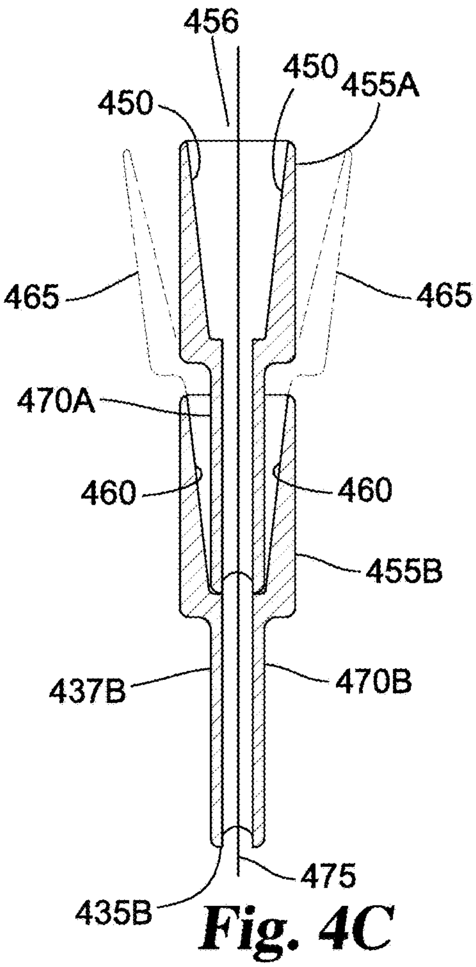
FIG. 4C is an alternative cross-sectional view of the support assembly of FIG. 1.
Figure 4D:
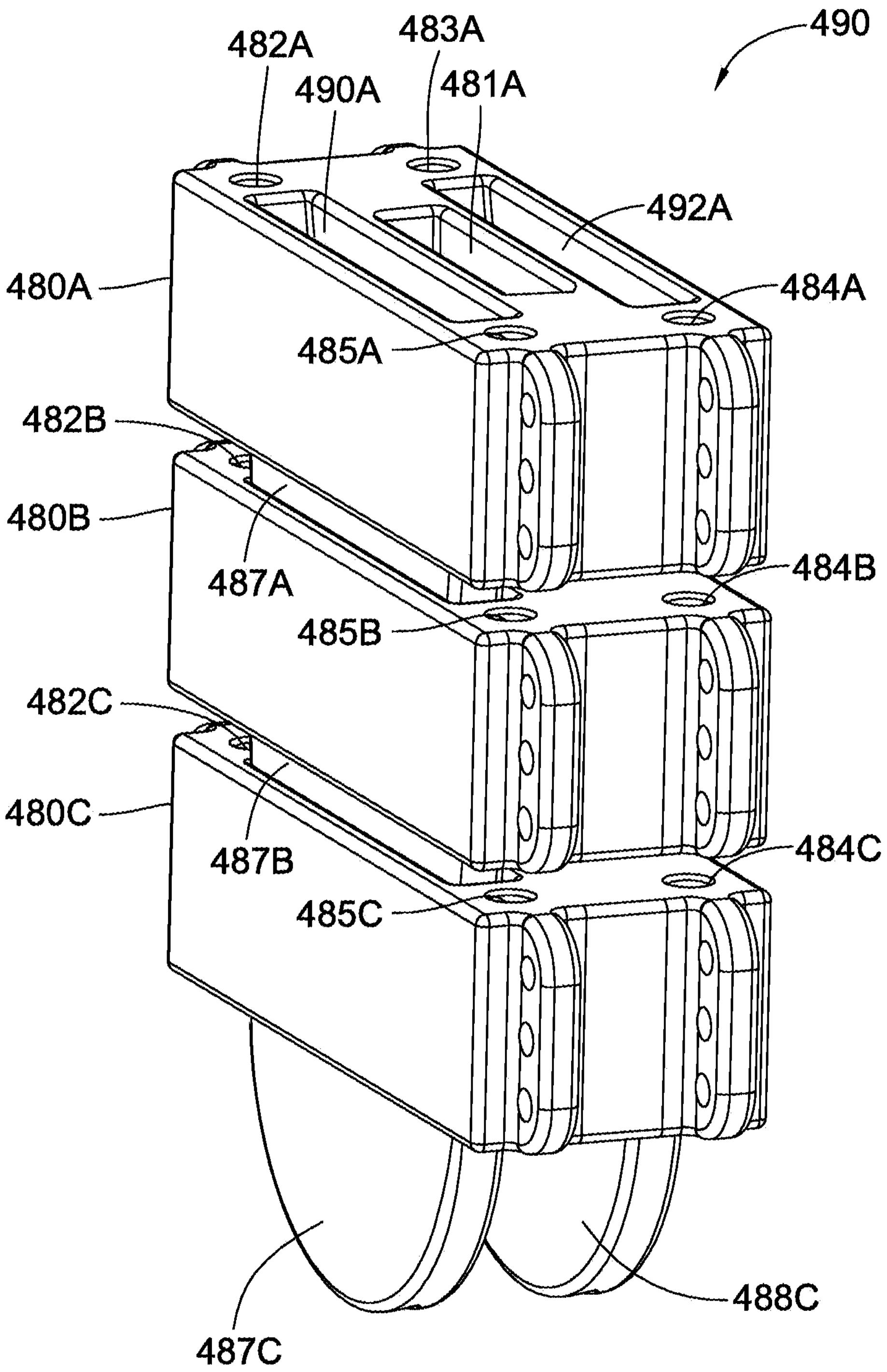
FIG. 4D is a perspective view of a support assembly.
Figure 4E:
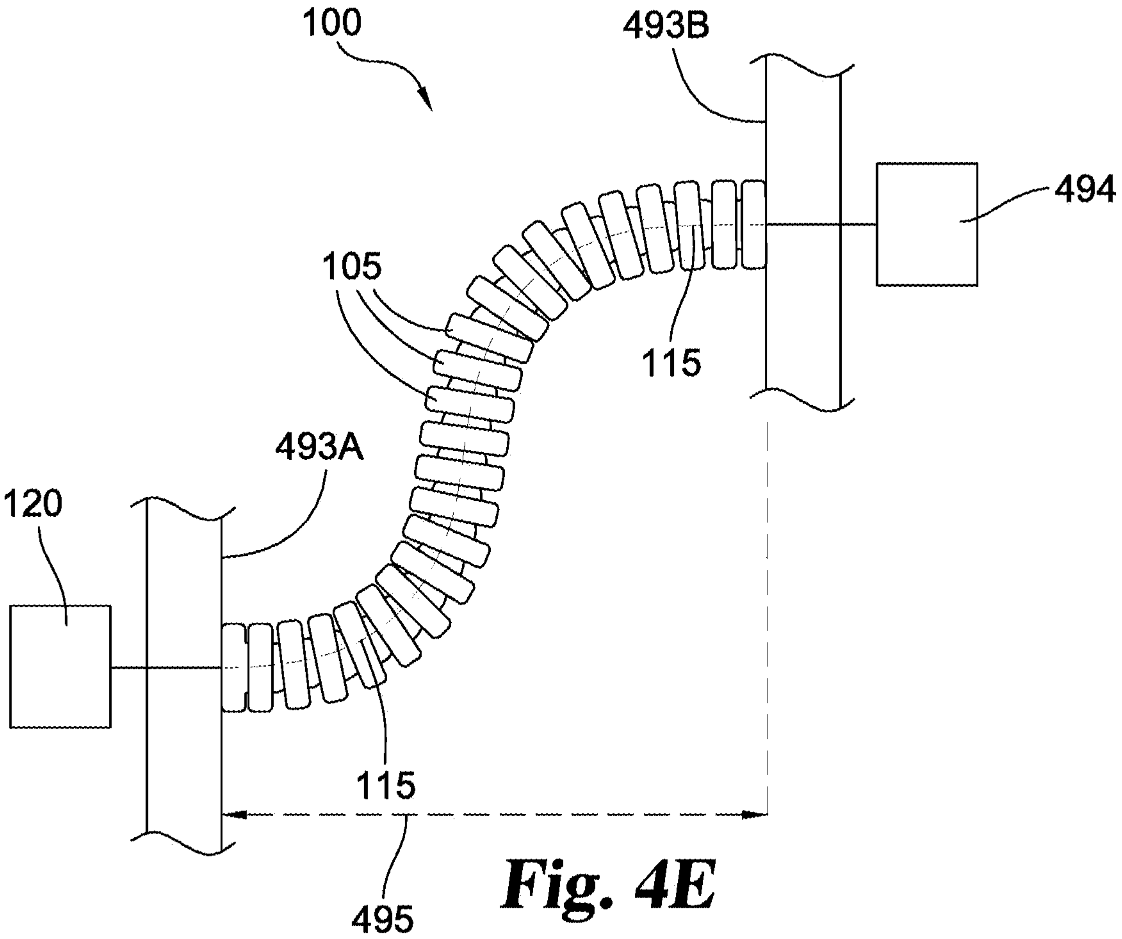
FIG. 4E is a schematic view of another example of a support assembly.

Another example of assembly 100 appears in FIG. 4E. As illustrated, the assembly of elements 105 may be "rigidized" by, for example, applying tension to retention member 115 against a load 494 coupled directly or indirectly to line 115. Tension may be applied to retention member 115 by, for example, actuator 120. As noted previously, actuator 120 may be any device configured to apply tension to member 115.

Assembly 100 may be coupled to another structure or structures here illustrated as structures 493A and 493B. Any of the elements in assembly 100 may be coupled to structures 493A and 493B, such as the first and last elements 105 in assembly 100 as shown. Structures 493A and 493B may be a single structure, or part of a collection of multiple other structures configured to maintain a predetermined separation 495 from one another regardless of whether tension is applied to line 115 or not.

Elements 105 maybe aligned within or substantially parallel to a plane of support as discussed above, but may also be laterally offset creating a nonlinear "rigidizable" structure. When the tension in line 115 is low or substantially zero, elements 105 may move relative to one another. Force may be applied by actuator 120 to "rigidize" the assembly by applying tension to the retention member 115 causing it to exert force on elements 105 urging them together. Thus assembly 100 may be made substantially rigid in a nonlinear arrangement.

Figure 5:
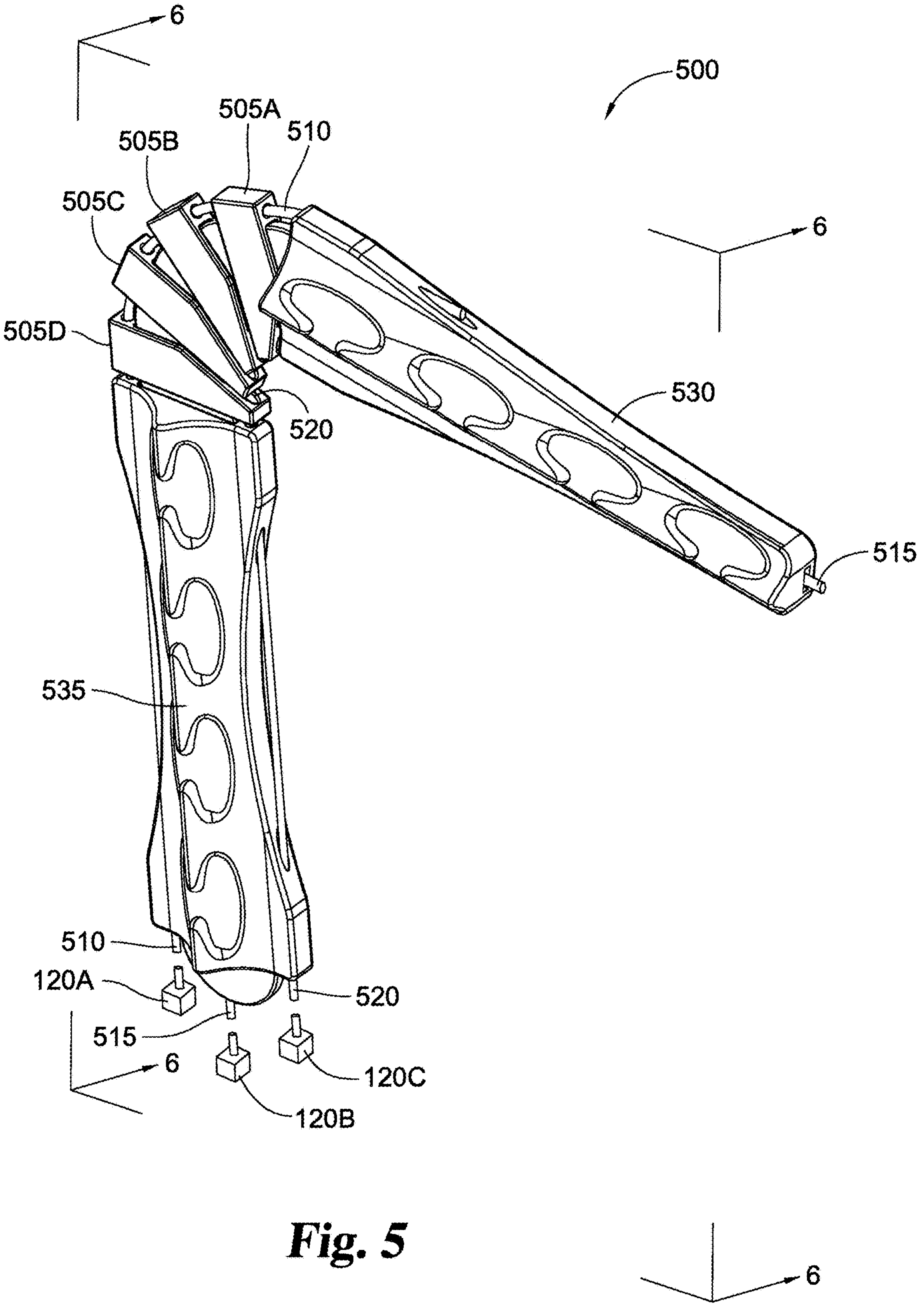
FIG. 5 is a perspective view of a support assembly.

In FIG. 5 is illustrated an example of a support assembly 500 where some of the supporting elements operate as frame members pivoting with other supporting elements. Support assembly 500 is similar to support assembly 100 in configuration and construction, and is configured to limit movement, rotation, flexing, or bending in a direction that is not within or substantially parallel to a plane of support illustrated here by section lines 6 which are arranged similar to section lines 3 in FIG. 2.

A first support frame 530 and a second support frame 535 are pivotally mounted to one another within support assembly 500 by supporting elements 505A-D. First and second support frames 530 and 535 may also be support elements similar to support elements 505A-D illustrating that no particular shape, size, or length is required for support elements in a support structure, that all elements in a support structure need not have the same physical dimensions, and that therefore support elements may be of any suitable size shape or configuration. A retention system may be included like the retention systems and devices discussed herein which can include a first line 510, second line 515, and a third line 520 passing through first and second support frame 530 and 535, and supporting elements 505A-D. Elements 505A-D are arranged like those illustrated in the preceding FIGS. 1-4C with a projecting member extending outwardly away from the supporting element and that is configured to be received within a corresponding slot or cavity defined by an adjacent supporting element. The retention system can keep the projecting members engaged within adjacent cavities allowing support elements to be rotatable around individual axes of rotation substantially perpendicular to the plane illustrated in FIG. 5 by section lines 6 (similar to the configuration shown in FIG. 2). As discussed above, lines 510, 515, 520 may appear in any suitable combination, of one, two, or three lines, and each line present may also be coupled to an actuator like actuator 120 shown in FIG. 1.

Figure 6:
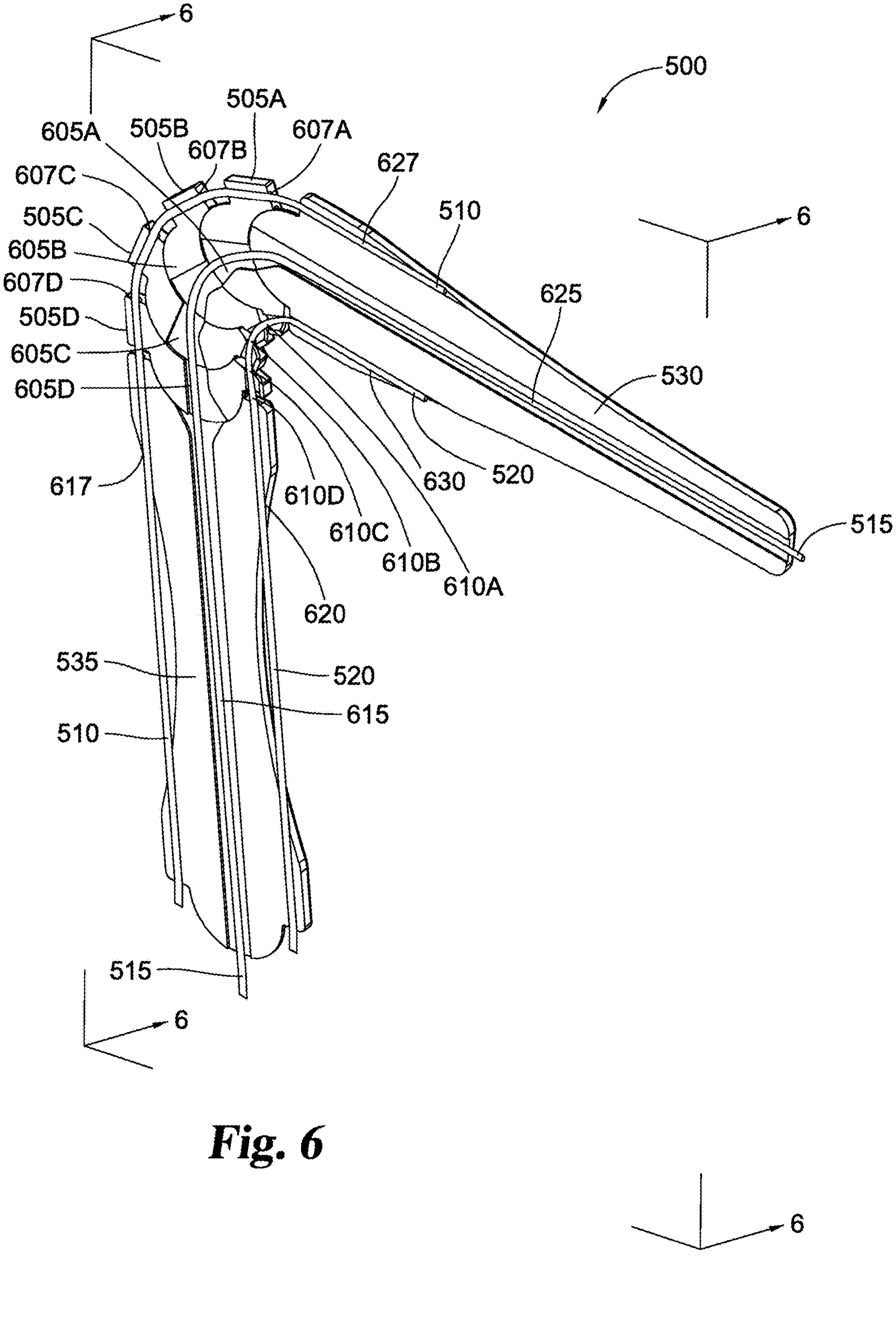
FIG. 6 is a cross-sectional view of the support assembly shown in FIG. 5.

Additional detail for support assembly 500 is illustrated in FIG. 6 where the support assembly 500 of FIG. 5 is sectioned along the support plane defined by section lines 6. Supporting elements 505A-D include passageways defined within the supporting elements similar to those illustrated in FIG. 3 that allow lines 510, 515, and 520 to pass through support assembly 500. As with previously shown examples, first line 510 passes through passageway 617, 607, and 627 defined by second support frame 535, supporting elements 505A-D, and first support frame 530 respectively. Similarly, second line 510 passes through passageway 615, 605, and 625 defined by second support frame 535, supporting elements 505A-D, and first support frame 530 respectively. Third line 520 likewise passes through passageway 620, 610, and 630 defined by second support frame 535, supporting elements 505A-D, and first support frame 530 respectively. This combination of passageways and lines allows projecting members of the support assembly to be retained within receiving cavities of adjacent supporting elements or frame members as described above. Lines 510, 515, and 520 may also be coupled to an actuator like actuator 120 as illustrated, or to another similar actuator described herein.

Figure 7:
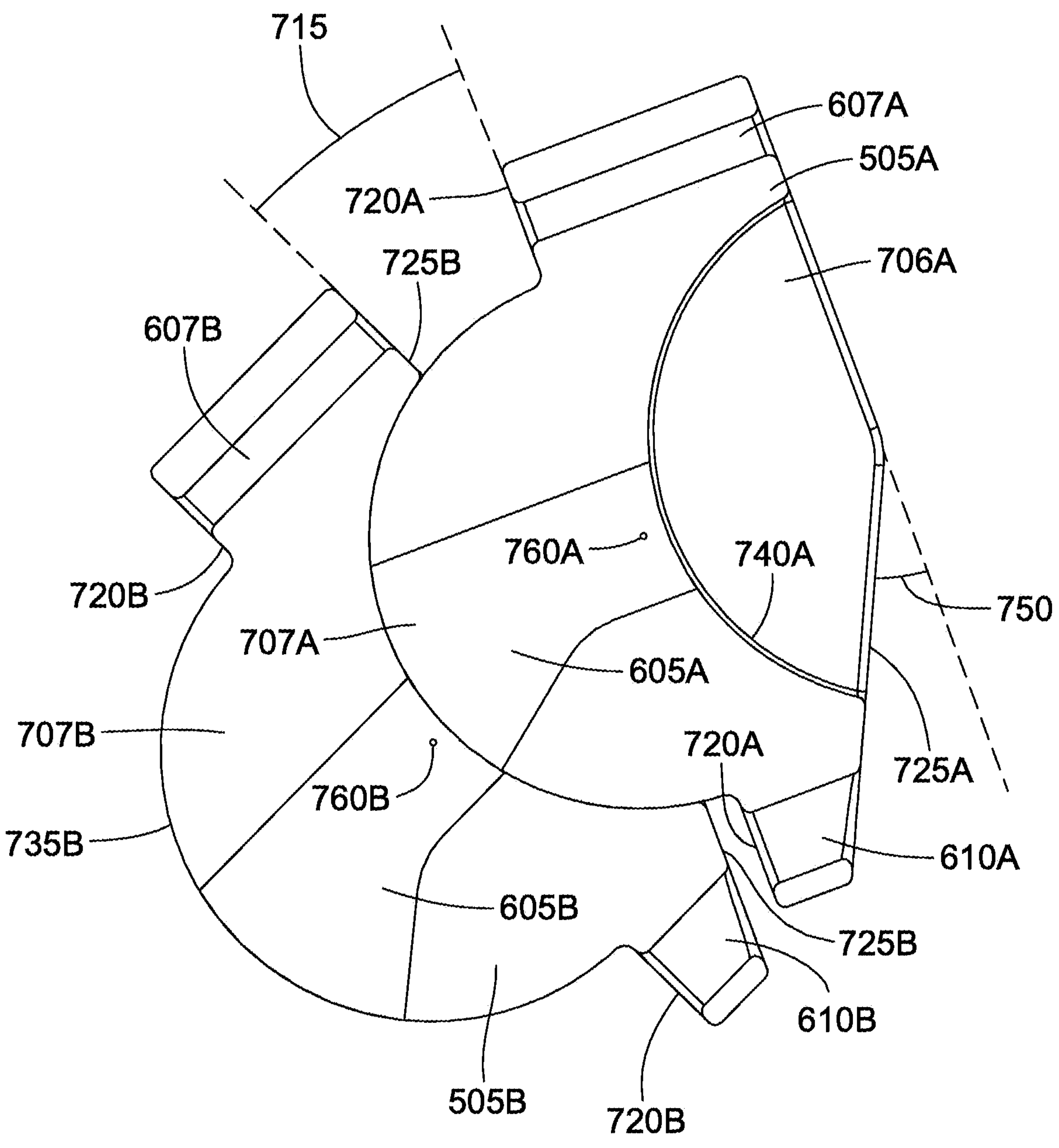
FIG. 7 is a side view of the support assembly of FIG. 6.

Additional detail for supporting elements 505 is illustrated in FIG. 7. Supporting elements 505 define a receiving cavity 706 for receiving a projecting member 707 similar to the way cavity 106 is configured to receive projecting member 107 illustrated in the preceding figures and described above. Receiving cavity 706 is illustrated in FIG. 7 like receiving cavity 107 in the preceding figures with a ovular, semicircular, or substantially circular shape with a surface 740 contacted or adjacent surface 735. As with surface 440 discussed above, the curvilinear shape of surfaces 735 and 740 provides pivotal motion around axis of rotation 760, which like axes 215 in FIG. 2, may be substantially perpendicular to the plane of support 6.

Like the examples shown in FIG. 4A-4C, pivotal or rotational movement between elements may be constrained by contact between the surfaces of the supporting elements. For example, supporting element 505A may pivot around axis of rotation 760A until a first surface 720A comes in contact with a second surface 725B of supporting element 505B. This allows for and angle of rotation 715 of one element relative to another in the support assembly of FIGS. 5-7. Angle 715 may be dependent on angle 750 defined by second surface 725 that slopes toward the opposing side of element 505A in the direction of first surface 720. The sloping second surface 725 allows one element 505 to rotate further around axis of rotation 760 before contacting a first surface 720 of an adjacent element 505. By including this "cutout," or angled surface as illustrated in FIGS. 5-7, supporting elements in the support assembly may rotate further relative to one another resulting in an increased range of motion within or substantially parallel to the supporting plane with the same or fewer supporting elements.

Another example of a support assembly like those illustrated in the preceding figures and described above is shown in FIG. 8. First frame member 530 and second frame member 535 are illustrated with retention system that includes first line 510 and third tension member 520 arranged and configured as discussed above to further include actuators 812A and 812B which can operate like actuator 120 discussed above. Support assembly 800 includes supporting elements 805A-C configured to provide rotational movement for support assembly 800 parallel to or within supporting plane illustrated by cross sectional lines 9. Actuating devices 812A and 812B may include motors, clutches, control devices, and other equipment for selectively applying tension to lines 510 A and 510 B like actuator 120. Actuating devices 812 A and 812 B may also include systems or devices for measuring the length of extension of lines 510 and 520 like the string potentiometers or other devices discussed above. Thus actuating devices 812 be may be configured to provide feedback and control as support assembly 800 flexes substantially parallel to support plane 9 and provides support by resisting movement in other directions.

Figure 9:
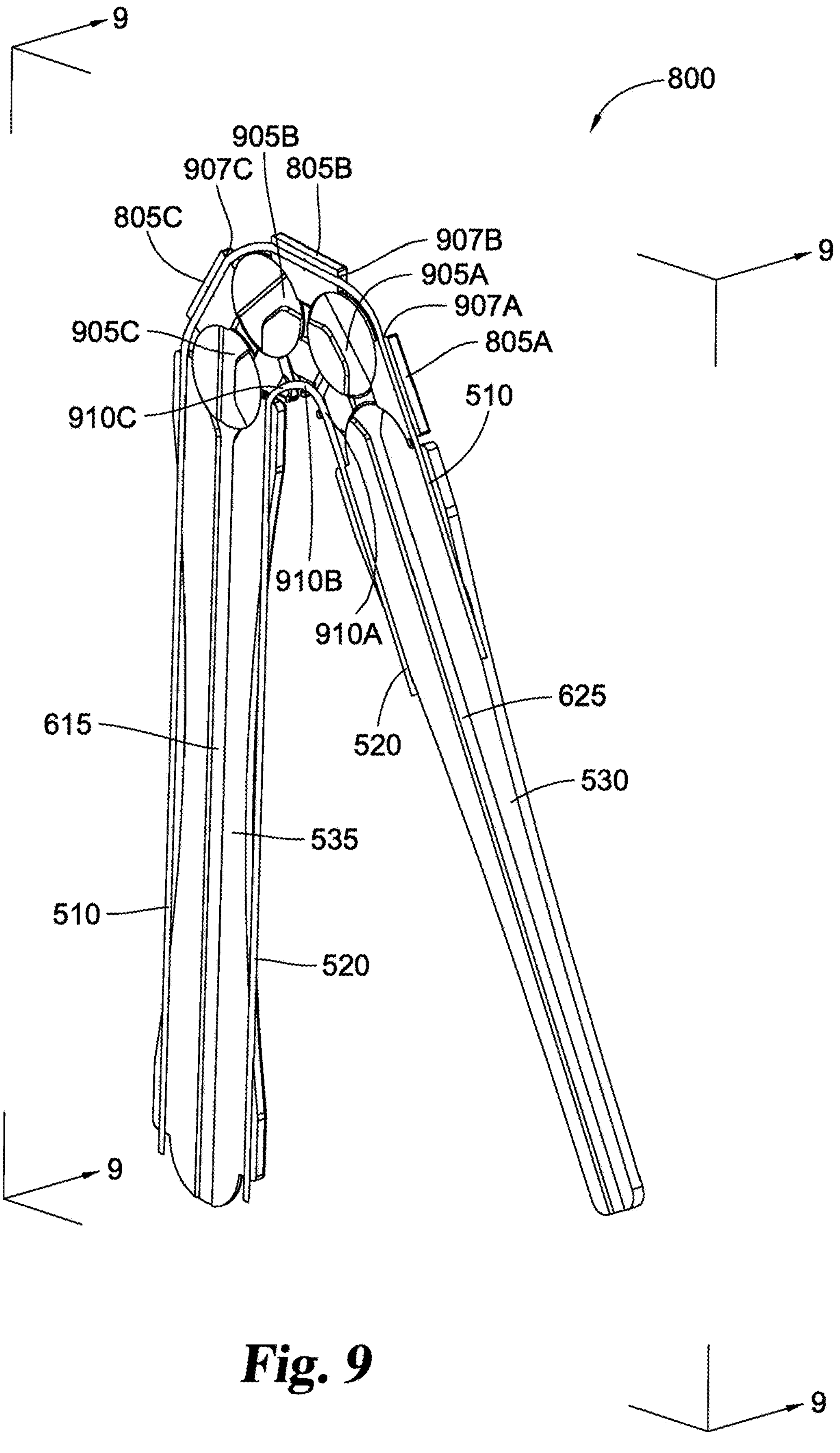
FIG. 9 is a cross-sectional view of the support assembly of FIG. 8.

FIG. 9 shows a cross-sectional view of support assembly 800 taken along support plane 9 and viewed in the direction of the arrows indicated by section lines 9. Like previous support assemblies 100 and 500, support assembly 800 has passageways 907 corresponding with passageway 617 and 627 in second support frame 535 and first support frame 530 respectively. Passageway 905 is configured to correspond with passageway 615 and 625 of second frame 535 and first frame 530 respectively. Likewise, passageway 910 corresponds with passageway 620 and 630 of first and second frames 535 and 530. In this example illustrated in FIG. 9, passageway 615 may be unused and therefore passageways 905A through 905C may not necessarily be aligned accordingly. Unused passageway 615, 905, and 625 allows for additional later cabling or other devices to be inserted through support assembly 800 such as sensors, or control lines for other equipment or devices that may pass through support assembly 800.

Figure 10:
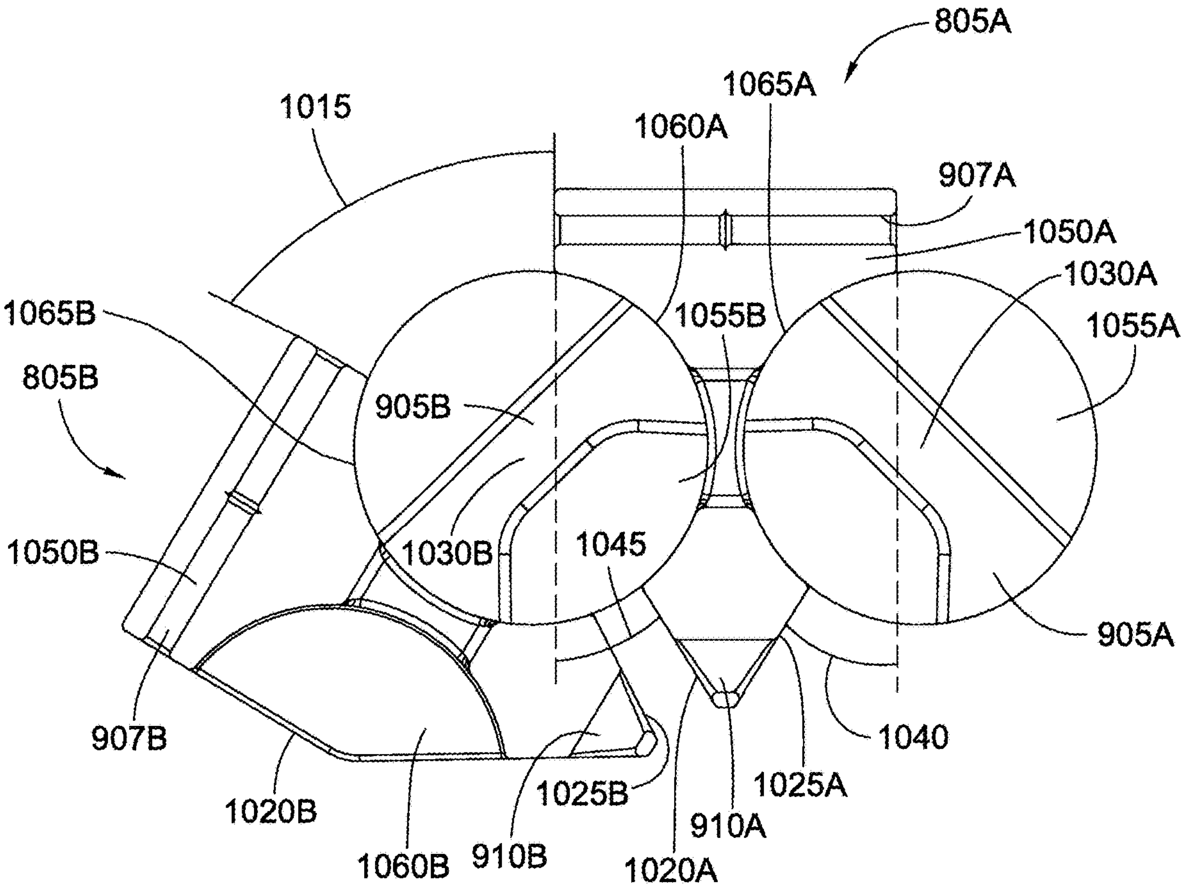
FIG. 10 is a side view of the support assembly of FIG. 9 with close-up sections.

FIG. 10 illustrates additional detail of support assembly 800. Support elements 805 comprise a body 1050 and a projecting member 1055 which may be separate and independent units. Following the principals disclosed herein, support element 805 provides an example of how any support element disclosed herein may be formed as a unitary molded structure from a single substance, or constructed of multiple pieces including the same or different materials with similar or different properties. Projecting members 1055 may be constructed of a separate material, or of the same material as body 1050. In this configuration, supporting elements 805 are not unitary molded structures but are composed of at least two separate individual pieces 1050 and 1055. For example, body 1050 may be formed from or may include a rigid polymeric material or metallic material while projecting members 1055 may be formed from or include a different material that may be less rigid, more rigid, or less susceptible to wear from frictional forces than the material used for body 1050.

Supporting elements disclosed herein may also be constructed like element 805 which may define multiple receiving cavities 1060 and 1065 rather than a single receiving cavity. As illustrated projecting member 1055A may be received within one of the receiving cavities 1065A while another separate projecting member 1055B may be received within receiving cavity 1060A of supporting element 805A and cavity 1065B of supporting element 805B.

Figure 8:
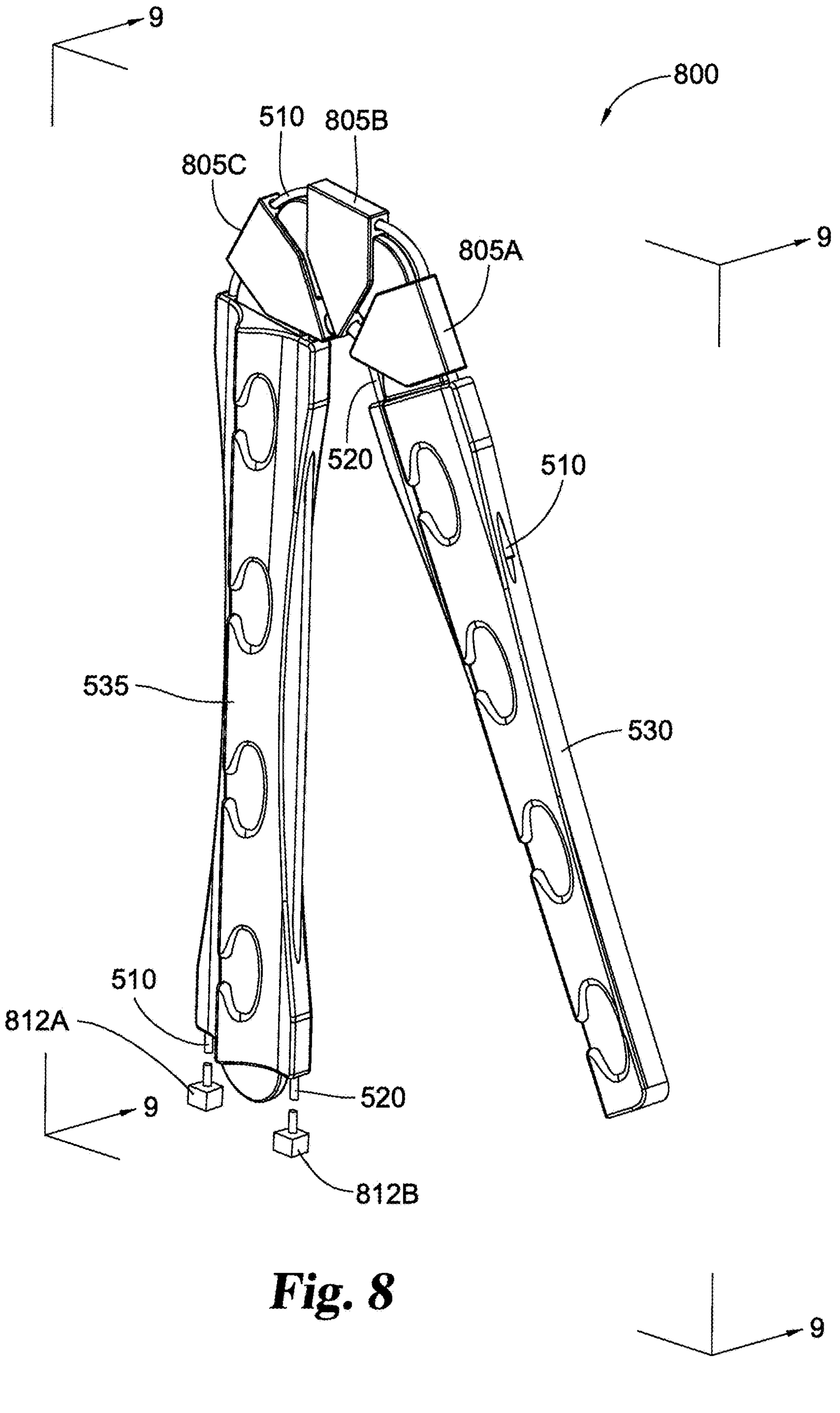
FIG. 8 is a perspective view of a support assembly.

As previously discussed, contacting surfaces of adjacent supporting elements may define the limit of rotation of one element with respect to adjacent elements. A first surface 1020 and a second service 1025 contacting one another may constrain pivotal movement of elements 805. In this example, body 1050A may define an angle of rotation with respect to body 1050B illustrated by angle 1015. Angle 1015 corresponds with angle 1040 which may define the angle at which second surface 1025 angles toward first surface 1020A. Also illustrated in FIG. 10 is first surface 1020A which may angle toward second surface 1025A according to angle 1045. Angles 1045 may be different angles, or they may be the same as well. As illustrated, greater angles 1040 and 1045 may result in further increasing the maximum extent of angle 1015. Elements 805A and 805B and others like them may thus rotate around axes of rotation 1030A and 1030B within or parallel to supporting plane 9 as illustrated in FIGS. 8 and 9.

Figure 11:
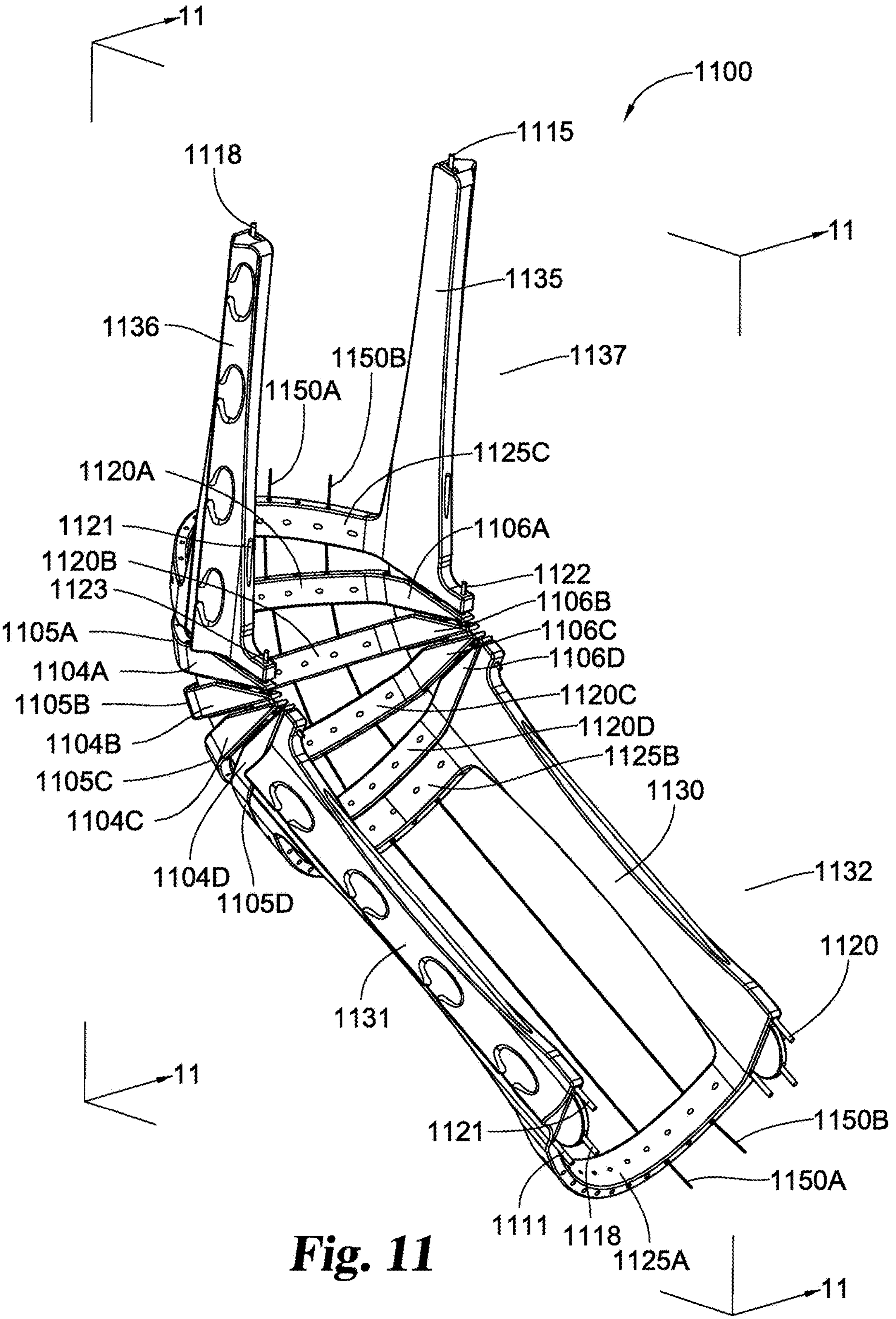
FIG. 11 is a perspective view of a support assembly.

Illustrated at 1100 in FIG. 11 is another example of a support assembly according to the examples and principals discussed previously and illustrated in the preceding figures. A first support frame 1132 and the second support frame 1137 are part of support assembly 1100. First support frame 1132 includes bracing members 1130 and 1131 on opposing ends of connecting segments 1125A and 1125B (here illustrated with an arch shape). Second support frame 1137 includes bracing members 1135 and 1136 on opposing ends of connecting segment 1125C. First and second support frames 1132 and 1137 are pivotally coupled together by support elements 1105A-1105D which are maintained in support system 1100 adjacent to bracing members 1135, 1136, 1130, and 1131 as illustrated.

Support elements 1105A-D may include separate coupling segments at opposing ends of connecting segments 1120A-D. Coupling elements 1104A-D can be mounted or formed at either or both ends of connecting segments 1120A-D and coupling elements 1106A-D may then be mounted at the opposing end. Coupling elements 1104 and 1106 can include projecting members and receiving cavities like those illustrated in any of the previous examples and may be constructed according to the principals discussed herein regarding support segments in a support assembly.

Figure 12:
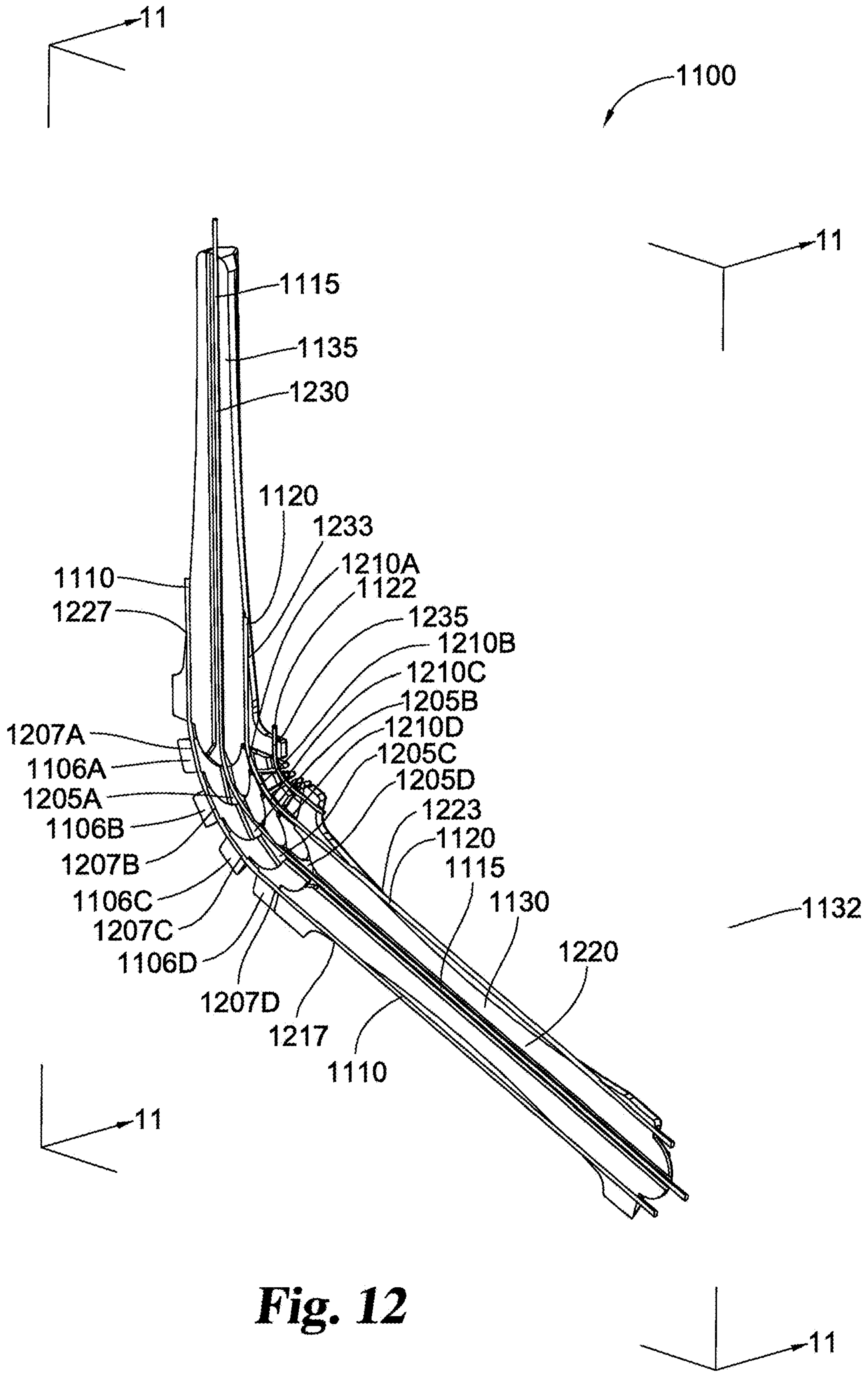
FIG. 12 is a cross-sectional view of a portion of the support assembly of FIG. 11.

As in previous examples, this arrangement of projecting members and receiving cavities or slots provides for flexibility in support assembly 1100 in or substantially parallel to a supporting plane 11 illustrated by section lines 11 in FIGS. 11 and 12. Additional support and strength may also be achieved by virtue of connecting segments 1125A-C and 1120A-D which together couple bracing members 1130, 1131, 1135, and 1136 to form a support assembly with additional rigidity against flexing supporting assembly 1100 in a direction other than substantially parallel to supporting plane 12.

First support frame 1132, second support frame 1137, and supporting elements 1105A-D can be maintained together by a retention system like those discussed previously that may or may not include actuators coupled to lines such as lines 1111, 1118, and 1121 passing through bracing member 1131, coupling elements 1104A-D, and bracing member 1136. Similarly, the retention system can include lines 1110, 1115, and 1120 passing through bracing members 1130, and 1137, as well as couple elements 1106A-D.

Any number of lines may be included and may be configured to operate as retention members as disclosed herein elsewhere. Additional lines such as lines 1122 and 1123 may also be included as well which can provide additional support. For example, lines 1150A and 1150B may also be included in support assembly 1100 passing between coupling elements 1104 on one side of the support assembly, and coupling elements 1106 on the other. These lines may pass through supporting structures between rows of coupling elements 1104 and 1106 with their projecting members and receiving cavities or sockets as discussed above and elsewhere in previous examples. Lines 1150 may be supported by, or provide additional support to, other structural members such as segments 1120A-C as illustrated.

FIG. 12 illustrates additional detail of a retention system for maintaining the support frames 1132 and 1137 engaged with support elements 1105. Bracing members 1130 of first support frame 1132 and bracing member 1135 of second support frame 1137 are illustrated in FIG. 12 sectioned along the plane indicated by section lines 11 from FIGS. 11 and 12. Lines 1110, 1115, 1120, and 1121 are illustrated passing through passageways defined by the supporting elements of support assembly 1100. For example, line 1110 passes through a passageway 1217 of bracing member 1130, through passageways 1207 in supporting elements 1106, and into passageway 1227 in bracing member 1135. Similarly, line 1115 passes through a passageway 1220 in bracing member 1130, through passageways 1205 in supporting elements 1106A-D, and into passageway 1230 defined by bracing member 1135. Another line 1120 passes through a passageway 1223 in bracing member 1130, through passageways 1210 in supporting elements 1106, and into passageway 1233 in bracing member 1135. An additional line 1121 passes through 1125 defined by bracing member 1130, through passageways defined by 1106A-D, and through passageway 1235 in bracing member 1135. Any of these lines may be actuated according to any of the principals and techniques discussed herein, and may include devices for measuring the extent and rate of deflection of supporting elements as discussed elsewhere. As also noted elsewhere, although the lines 1110, 1115, 1120, and 1121 may be referred to as "line" and the like, they may appear in any suitable combination of metal or textile cables, wires, cables carrying data signals, tubes carrying fluids, biasing elements, and the like, and may or may not actively constrain the support elements to remain engaged at all times.

Figure 13:
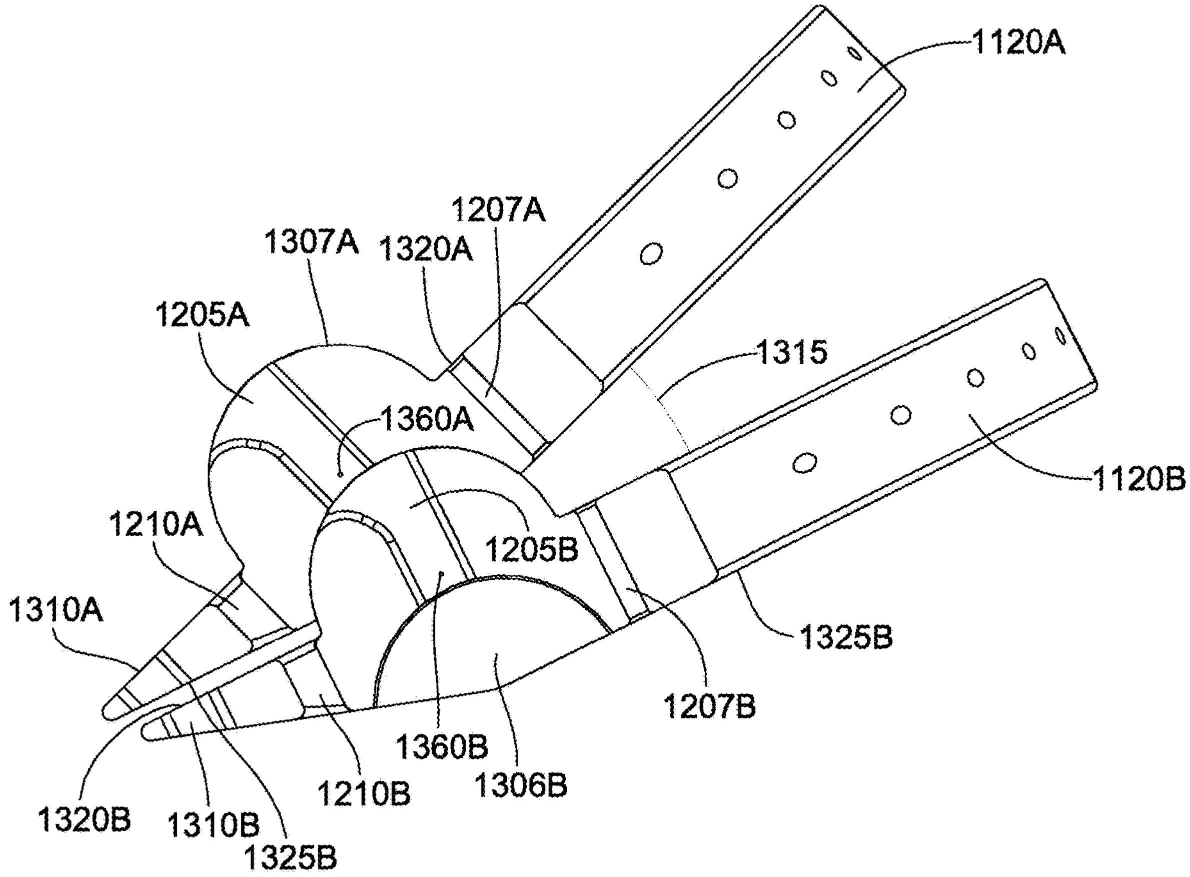
FIG. 13 is a cross-sectional view of a portion of the support assembly of FIG. 11.

In accordance with earlier examples and as shown in FIGS. 12 and 13, frames 1132 and 1137 can move within or substantially parallel with respect to plane 12 like the various other support assemblies discussed herein. This behavior may be achieved by a slot and cavity arrangement at opposite ends of connecting segments 1120 which may be configured similar to other elements disclosed herein elsewhere. Additional detail of these segments is illustrated in FIG. 13 where a cross-section of one end of connecting segments 1120 can be seen illustrating the arrangement of cavities and projecting members of the support elements which may be configured like the support assemblies discussed herein. Projecting member 1307 is configured to be positioned within cavity 1306 allowing pivoting or rotation around axes of rotation 1360 by support element 1120A with respect to 1120B. The support elements 1120 may pivot with respect to one another deflecting away from each other according to angle 1315. The extent of their pivotal motion may be limited by contact between a first surface 1320 and a second surface on an adjacent supporting element 1325.

The rotation may be modified by lines passing through passageways 1207, 1205, 1210, and 1310 as noted elsewhere. Such lines may be actively or passively actuated to increase or decrease tension forces between the elements thus urging projecting members 1307 into cavities 1306. Lines 1207, 1205, 1210, and 1310 may thus operate as retention members retaining the "slots" within the adjacent corresponding "cavities" as discussed herein. In other words, as discussed herein elsewhere, by applying tension internally between elements in the assembly, the assembly as a whole may be non-compressible and able to reduce or eliminate internal compression thus transmitting compression forces through the assembly to other objects as desired.

The concepts illustrated and disclosed herein may be configured according to any of the following numbered non-limiting examples:

Example 1

A support assembly, comprising first and second support elements positionable in a linearly aligned arrangement in which the support elements extend longitudinally within a first plane, wherein the first support element has a projecting member extending outwardly away from the support element, wherein the second support element defines a receiving cavity defined by and within the support element, wherein the first and second support elements define a first passageway extending through the first and second support elements, and wherein the projecting member of the first support element is receivable and moveable within the receiving cavity of the second support element; and a retention system including a first retention member extending along a longitudinal axis and passing through the first passageways in the first and second support elements, wherein the retention system is arranged and configured to retain the projecting member of the first element within the cavity of the second element when the retention system is actuated to prevent disengagement of the first support element from the second support element;

wherein the support elements are substantially prevented from moving or rotating out of the first plane by virtue of the positioning of the projecting member within the receiving cavity; and wherein the first support element is rotatable around a first axis of rotation substantially perpendicular to the longitudinal axis and the first plane, the first support element rotatable by virtue of rotation of the projecting member within the receiving cavity.

Example 2

The support assembly of example 1, wherein the projecting member of the first and second elements is substantially planar and is substantially perpendicular to the axis of rotation.

Example 3

The support assembly of any preceding example, wherein the first passageway extending through the body passes through the projecting member.

Example 4

The support assembly of any preceding example, wherein the first and second support elements have a first side and a second side, wherein the projecting member extends outwardly away from the first side of the first element, and the cavity extends inwardly from the second side of the second element, and wherein the first support element has a maximum rotation defined by contact between the first side of the first body and the second side of the second body.

Example 5

The support assembly of any preceding example, wherein the first support element is arranged and configured to rotate less than about 5 degrees relative to the second support element.

Example 6

The support assembly of any preceding example, wherein the first support element is arranged and configured to rotate less than about 35 degrees relative to the second support element.

Example 7

The support assembly of any preceding example, further comprising a second passageway defined by the first and second support elements, wherein the second passageway passes through the first and second support elements; and a second retention member passing through the second passageway in the first and second support elements, wherein the retention system includes the first and second retention members, and wherein the retention system is arranged and configured to maintain the projecting member of the first element within the cavity of the second element when one or both of the first and second retention members is actuated.

Example 8

The support assembly of example 7, wherein application of tension to the second retention member causes at least the first support element to rotate with respect to the second support element toward the second retention member.

Example 9

The support assembly of example any preceding example, wherein the first retention member includes a biasing element configured to apply a tension to the first retention member.

Example 10

The support assembly of example 9, wherein the biasing element is a spring.

Example 11

The support assembly of any preceding example, wherein the first retention member is an elastic band.

Example 12

The support assembly of any preceding example, wherein the first and second support elements are each a unitary molded structure.

Example 13

The support assembly of any preceding example, wherein the first support element has a receiving cavity defined by and within the first support element, and wherein the second support element has a projecting member extending outwardly away from the second support element.

Example 14

The support assembly of any preceding example, wherein the first and second support elements comprise a body, wherein the body of the first support element defines a receiving cavity, wherein the body of the second element defines the receiving cavity of second element, and wherein the projecting member is separate from the first and second elements and positionable within the receiving cavities of the first and second elements.

Example 15

The support assembly of example 14, wherein the projecting member and the first element body are formed from different materials.

Example 16

The support assembly of example 14, wherein the projecting member is rotatable within the receiving cavities defined by the first and second element bodies around the first axis of rotation.

Example 17

A support assembly, comprising a plurality of support elements coupled together and aligned along a longitudinal axis that is substantially parallel to a first plane, wherein each of the support elements defines a receiving cavity within the support element, a projecting member extending outwardly away from the support element, and a first passageway extending through the support element, wherein the projecting members are receivable and rotatable within corresponding receiving cavities of adjacent support elements, wherein the projecting members extend outwardly substantially parallel to the longitudinal axis, wherein the support assembly is configured to be flexible parallel to the first plane by virtue of the projecting members rotatably received within the corresponding receiving cavities of the plurality of support elements, and wherein the plurality of support elements are substantially prevented from moving or rotating out of the first plane by virtue of the positioning of the projecting members within the corresponding receiving cavities; and a retention system including a first retention member passing through the first passageway of the plurality of support elements, wherein the first retention member is arranged and configured to retain the projecting members within the corresponding receiving cavities of adjacent support elements, and wherein the first retention member is configured to align the plurality of support elements along the longitudinal axis.

Example 18

The support assembly of example 17, wherein the first passageway extending through the bodies of the plurality of support elements passes through the corresponding projecting members.

Example 19

The support assembly of any of examples 17 and 18, wherein the support element have a first side and a second side, wherein the projecting members extend outwardly away from the corresponding first sides, and the corresponding receiving cavities extend inwardly from the second sides, and wherein a maximum rotation of a first support element of the plurality of support elements is limited by contact between the first side of the first support element and the second side of a second support element of the plurality of support elements, wherein the first support element is adjacent to the second support element.

Example 20

The support assembly of any of examples 17-19, wherein the plurality of support elements are arranged and configured to rotate less than about 5 degrees around the corresponding axes of rotation.

Example 21

The support assembly of any of examples 17-20, wherein the plurality of support elements are arranged and configured to rotate less than about 35 degrees around the corresponding separate axes of rotation.

Example 22

The support assembly of any of examples 17-21, further comprising a second passageway defined by each of the support elements, wherein the second passageway passes through each of the support elements; and a second retention member passing through the second passageway;

wherein the retention system includes the first and second retention members, and wherein the first and second retention members are arranged and configured to maintain the projecting members of the plurality of support elements within the corresponding cavities of adjacent support elements.

Example 23

The support assembly of example 22, wherein the first and second retention members are cables, and wherein first and second retention members are configured to control the rotation of the two or more support elements.

Example 24

The support assembly of any of examples 17-23, further comprising a biasing element coupled to the first retention member, wherein the biasing element applies a tension to the first retention member for maintaining the plurality of support members adjacent to each other.

Example 25

The support assembly of any of examples 17-24, wherein the biasing element is a spring.

Example 26

The support assembly of any of examples 17-25, wherein the first retention member is an elastic member arranged and configured to maintain the plurality of support members adjacent to each other.

Example 27

The support assembly of any of examples 17-26, wherein each of the plurality of support elements is a unitary molded structure.

Example 28

A support assembly, comprising first and second support elements each having a first coupling segment at one end, a second coupling segment at the opposite end, and an connecting segment between the first and second coupling segments, wherein each coupling segment of each of the first and second support elements includes a receiving cavity, a projecting member and a first passageway extending through the segment, wherein the projecting member of the first element is receivable and moveable within the receiving cavity of the second element; and a retention system including a first retention member passing through the first passageway in the first couplings of the first and second support elements, and a second retention member passing through the first passageway in the second couplings of the first and second support elements, wherein the retention system is arranged and configured to retain the projecting members of the first element within the cavities of the second element when the retention system is actuated to prevent disengagement of the support elements;

wherein the support elements are arranged such that the first coupling segments extend within a first plane and the second coupling segments extend with a second plane, wherein the first and second coupling segments are substantially prevented from moving or rotating out of the first and second planes, respectively, by virtue of the positioning of the projecting members within the receiving cavities; and wherein the first support element is rotatable around a first axis of rotation substantially perpendicular to at least one of the first and second planes, by virtue of rotation of the projecting members within the receiving cavities.

Example 29

The support assembly of example 28, further comprising a first support frame coupled to the first support element having first and second elongate bracing members, wherein the first and second elongate bracing members extend away from the respective first and second coupling segments of the first support element, wherein the first and second elongate bracing members are coupled to the first and second coupling segments, and wherein the first elongate bracing member is substantially parallel to the first plane, and the second elongate bracing member is substantially parallel to the second plane.

Example 30

The support assembly of example 29, wherein the first and second elongate bracing members of the first support frame each define separate first and second bracing member passageways extending longitudinally through the respective first and second elongate bracing members.

Example 31

The support assembly of any of examples 28-30, further comprising a second support frame coupled to the second support element having first and second elongate bracing members, wherein the first and second elongate bracing members extend away from the respective first and second coupling segments of the second support element, wherein the first and second elongate bracing members are coupled to the first and second coupling segments, and wherein the first elongate bracing member is substantially parallel to the first plane, and the second elongate bracing member is substantially parallel to the second plane.

Example 32

The support assembly of example 31, wherein the first and second elongate bracing members of the second support frame each define separate first and second bracing member passageways extending longitudinally through the respective first and second elongate bracing members.

Example 33

The support assembly of any of examples 28-32, wherein the first and second planes are substantially parallel.

While the invention has been illustrated and described in detail in the drawings and foregoing description and examples, the same is to be considered as illustrative and not restrictive in character, it being understood that only some examples have been shown and described and that all changes, equivalents, and modifications that come within the spirit of the inventions defined by the following claims are desired to be protected.

What is claimed is:

1. An assembly, comprising:

multiple support elements aligned along a reference plane, the support elements having at least one projecting member extending outwardly away from each support element, the support elements defining:

a receiving cavity within each support element; and a first passageway through the multiple support elements;

wherein the projecting member of at least one of the multiple support elements is received by the receiving cavity of at least one other of the multiple support elements;

a retention system including a first retention member and an actuator engaged with the first retention member, wherein the first retention member extends longitudinally and passes through the first passageways in the support elements, wherein the actuator is configured to apply tension to the first retention member to bias the multiple support elements towards each other to retain the projecting member of one support element in the corresponding cavity of a neighboring support element, wherein the actuator is positioned on an opposite side of the first structure relative to the multiple support elements;

wherein the support elements are substantially prevented from moving or rotating out of the reference plane when the retention system is actuated by virtue of the positioning of the projecting members within the receiving cavities;

wherein the multiple support elements are positioned in a space between a first and second support structure;

wherein the first passageway extends through the support elements and passes through the projecting member of at least two support elements; and wherein the first retention member is coupled to a load positioned outside the space between the first and second support structures.

2. The assembly of claim 1, wherein the first and second structures are separated by a predetermined distance, and wherein the predetermined separation between the first and second structures is maintained when the actuator is actuated.

3. The assembly of claim 1, wherein the first and second structures positioned adjacent either end of the multiple support elements.

4. The assembly of claim 1, wherein the multiple support elements are positioned between the first and second structures.

5. The assembly of claim 1, further comprising:

a first end support element, wherein the first end support element is coupled to the first structure, wherein the first end support element has a projecting member extending outwardly away from the first end support element, wherein the projecting member on the first end support element is received within the receiving cavity of one of the multiple support elements; and a second end support element, wherein the second end support element is coupled to the second structure, wherein the second end support element defines a receiving cavity, wherein the projecting member on one of the multiple support elements is received within the receiving cavity of the second end support element.

6. The assembly of claim 1, wherein each of the support elements is rotatable relative to a neighboring support element around an axis of rotation substantially perpendicular to the reference plane, each support element being rotatable by virtue of rotation of the projecting member within the receiving cavity.

7. The assembly of claim 4, wherein the projecting members of the multiple support elements are substantially planar within the reference plane and are substantially perpendicular to the axis of rotation for each support element.

8. The assembly of claim 1, wherein the multiple elements define a second passageway extending through the multiple support elements.

9. The assembly of claim 8, wherein the retention system further includes a second retention member passing through the second passageway in the multiple support elements, and wherein the retention system is arranged and configured to maintain the projecting member of one support element in the corresponding cavity of a neighboring support element when one or both of the first and second retention members is actuated.

10. The assembly of claim 9, wherein the retention system includes a first actuator and a second actuator, and wherein the first retention member is coupled to the first actuator, and the second retention member is coupled to the second actuator.

11. The assembly of claim 1, wherein the multiple support elements include body portions, wherein the body portions of the support elements define the receiving cavities of the support elements, and wherein the projecting members of the support elements are separate from the body portions of the support elements.

12. The assembly of claim 11, wherein the projecting members and the body portions are formed from different materials.

13. The assembly of claim 1, wherein at least one support element includes multiple projecting members extending from that support element, and wherein at least one support element defines multiple cavities configured to receive the multiple projecting members.

14. The assembly of claim 13, wherein the multiple projecting members are planar and define a curvilinear shape at the ends of the projecting members where the projecting members engage the multiple cavities.

15. The assembly of claim 13, wherein the multiple projecting members extend from the support element side by side adjacent one another with an intervening space between them.

16. The assembly of claim 13, wherein the multiple projecting members of at least one support element define a convex curvilinear shape extending away from the support element, and wherein the multiple cavities of at least one support element define a concave curvilinear shape extending into the second support element.

17. The assembly of claim 1, wherein the retention system includes a measuring device configured to determine tension on the first retention member.

18. The assembly of claim 1, wherein the retention member includes a cable made primarily of metallic or polymeric materials.

19. The assembly of claim 1, wherein the multiple support elements are separate unitary molded structures.

20. The assembly of claim 1, wherein the first retention member includes a biasing element configured to apply a tension to the first retention member.

* * * * *